(12) United States Patent
Ortiz et al.

(10) Patent No.: US 9,646,444 B2
(45) Date of Patent: *May 9, 2017

(54) ELECTRONIC WIRELESS HAND HELD MULTIMEDIA DEVICE

(71) Applicants: Luis M. Ortiz, Albuquerque, NM (US); Kermit D. Lopez, Albuquerque, NM (US)

(72) Inventors: Luis M. Ortiz, Albuquerque, NM (US); Kermit D. Lopez, Albuquerque, NM (US)

(73) Assignee: Mesa Digital, LLC, Albuquerque, NM (US)

( * ) Notice: Subject to any disclaimer, the term of this patent is extended or adjusted under 35 U.S.C. 154(b) by 246 days.

This patent is subject to a terminal disclaimer.

(21) Appl. No.: 14/622,201

(22) Filed: Feb. 13, 2015

(65) Prior Publication Data

US 2015/0172437 A1    Jun. 18, 2015

Related U.S. Application Data

(63) Continuation of application No. 12/257,205, filed on Oct. 23, 2008, now Pat. No. 9,031,537, which is a
(Continued)

(51) Int. Cl.
*G07C 9/00* (2006.01)
*G06Q 10/06* (2012.01)
(Continued)

(52) U.S. Cl.
CPC ......... *G07C 9/00674* (2013.01); *G06Q 10/06* (2013.01); *G06Q 20/322* (2013.01);
(Continued)

(58) Field of Classification Search
CPC ............................ G06F 21/35; G07C 9/00674
(Continued)

(56) References Cited

U.S. PATENT DOCUMENTS

| 4,183,056 A | 1/1980 | Evans et al. |
|---|---|---|
| 4,433,387 A | 2/1984 | Dyer et al. |

(Continued)

FOREIGN PATENT DOCUMENTS

| CA | 2237939 | 9/1999 |
|---|---|---|
| EP | 0 934 765 A1 | 8/1999 |

(Continued)

OTHER PUBLICATIONS

U.S. Appl. No. 09/316,328, filed May 21, 1999, Ramadan et al.
(Continued)

*Primary Examiner* — Md S Elahee
(74) *Attorney, Agent, or Firm* — Luis M. Ortiz; Kermit D. Lopez; Ortiz & Lopez, PLLC

(57) ABSTRACT

An electronic wireless hand held multimedia device includes a microprocessor and more than one wireless transceiver modules enabling wireless communications over a variety of standards, including Cellular (e.g., GSM, CDMA, CPRS, 3G), 802.11 (e.g., WLAN), and short range (e.g., Bluetooth, infrared, RFID), for the retrieval, processing and delivery of multimedia data to/from remote data resources (e.g., Internet, servers). The hand held device can include any of: a touch sensitive display screen configured to display multimedia data including video, text and GPS maps, and accept user input; a cartridge reader configured to exchange data with an electronic cartridge; a GPS module configured to operate with mapping resources and provide location information and GPS mapping; a mobile payment module enabling mobile payments via a variety of billing arrangements; a security module enabling protected data management and communications security; a video camera enabling the capture, storage, processing and transmission of video and pictures.

20 Claims, 6 Drawing Sheets

Related U.S. Application Data continuation of application No. 09/887,492, filed on Jun. 22, 2001, now Pat. No. 7,630,721, said application No. 12/257,205 is a continuation of application No. 09/902,348, filed on Jul. 10, 2001, now Pat. No. 7,812,856.

(60) Provisional application No. 60/214,339, filed on Jun. 27, 2000, provisional application No. 60/243,561, filed on Oct. 26, 2000.

(51) Int. Cl.
| | | |
|---|---|---|
| *H04L 29/06* | (2006.01) | |
| *H04W 4/02* | (2009.01) | |
| *G06Q 20/32* | (2012.01) | |
| *H04M 1/725* | (2006.01) | |
| *H04W 4/00* | (2009.01) | |
| *H04W 12/00* | (2009.01) | |
| *H04L 29/08* | (2006.01) | |

(52) U.S. Cl.
CPC ........ *H04L 63/083* (2013.01); *H04L 63/0861* (2013.01); *H04L 67/02* (2013.01); *H04L 67/04* (2013.01); *H04L 67/18* (2013.01); *H04L 67/289* (2013.01); *H04L 67/2842* (2013.01); *H04L 67/306* (2013.01); *H04L 69/329* (2013.01); *H04M 1/72522* (2013.01); *H04W 4/008* (2013.01); *H04W 4/02* (2013.01); *H04W 12/00* (2013.01); *H04L 63/102* (2013.01); *H04L 67/1095* (2013.01)

(58) Field of Classification Search
USPC ....... 455/3.05, 41.1–41.3, 410–414.2, 552.1, 455/509, 411; 379/88.13, 142.05, 903, 379/908, 915, 91; 705/7.14, 14.51; 342/357.1; 713/300
See application file for complete search history.

(56) References Cited

U.S. PATENT DOCUMENTS

| | | |
|---|---|---|
| 4,443,387 A | 4/1984 | Gordon |
| 4,817,948 A | 4/1989 | Simonelli |
| 4,994,909 A | 2/1991 | Graves et al. |
| 5,036,537 A | 7/1991 | Jeffers et al. |
| 5,159,592 A | 10/1992 | Perkins |
| 5,164,827 A | 11/1992 | Paff |
| 5,189,632 A | 2/1993 | Paajanen et al. |
| 5,243,415 A | 9/1993 | Vance |
| 5,295,180 A | 3/1994 | Vendetti et al. |
| 5,299,117 A | 3/1994 | Farnbach |
| 5,299,177 A | 3/1994 | Koch |
| 5,413,345 A | 5/1995 | Nauck |
| 5,422,816 A | 6/1995 | Sprague et al. |
| 5,448,291 A | 9/1995 | Wickline |
| 5,448,726 A | 9/1995 | Cramsie et al. |
| 5,485,504 A | 1/1996 | Ohnsorge |
| 5,491,507 A | 2/1996 | Umezawa et al. |
| 5,508,731 A | 4/1996 | Kohorn |
| 5,513,384 A | 4/1996 | Brennan et al. |
| 5,521,958 A | 5/1996 | Selig et al. |
| 5,530,924 A | 6/1996 | Miller |
| 5,546,538 A | 8/1996 | Cobbley et al. |
| 5,561,712 A | 10/1996 | Nishihara |
| 5,579,239 A | 11/1996 | Freeman et al. |
| 5,582,015 A | 12/1996 | Davidson |
| 5,585,850 A | 12/1996 | Schwaller |
| 5,598,208 A | 1/1997 | McClintock |
| 5,600,368 A | 2/1997 | Matthews, III |
| 5,613,191 A | 3/1997 | Hylton et al. |
| 5,621,732 A | 4/1997 | Osawa |
| 5,627,915 A | 5/1997 | Rosser et al. |
| 5,642,378 A | 6/1997 | Denheyer |
| 5,663,717 A | 9/1997 | DeLuca |
| 5,673,317 A | 9/1997 | Cooper |
| 5,689,549 A | 11/1997 | Bertocci et al. |
| 5,708,961 A | 1/1998 | Hylton et al. |
| 5,719,936 A | 2/1998 | Hillenmayer |
| 5,724,492 A | 3/1998 | Matthews, III et al. |
| 5,726,660 A | 3/1998 | Purdy et al. |
| 5,729,471 A | 3/1998 | Jain et al. |
| 5,729,535 A | 3/1998 | Rostoker et al. |
| 5,742,521 A | 4/1998 | Ellenby et al. |
| 5,757,916 A | 5/1998 | MacDoran et al. |
| 5,758,088 A | 5/1998 | Bezaire et al. |
| 5,760,824 A | 6/1998 | Hicks, III |
| 5,760,848 A | 6/1998 | Cho |
| 5,761,697 A | 6/1998 | Curry et al. |
| 5,763,864 A | 6/1998 | O'Hagan et al. |
| 5,768,151 A | 6/1998 | Lowy et al. |
| 5,778,187 A | 7/1998 | Monteiro et al. |
| 5,793,416 A | 8/1998 | Rostoker et al. |
| 5,793,630 A | 8/1998 | Theimer et al. |
| 5,797,089 A | 8/1998 | Nguyen |
| 5,802,294 A | 9/1998 | Ludwig et al. |
| 5,806,005 A | 9/1998 | Hull et al. |
| 5,808,695 A | 9/1998 | Rosser et al. |
| 5,812,819 A | 9/1998 | Rodwin et al. |
| 5,822,324 A | 10/1998 | Kostresti et al. |
| 5,826,185 A | 10/1998 | Wise et al. |
| 5,835,061 A | 11/1998 | Stewart |
| 5,835,858 A | 11/1998 | Vaihoja et al. |
| 5,841,122 A | 11/1998 | Kirchhoff |
| 5,847,612 A | 12/1998 | Birleson |
| 5,847,762 A | 12/1998 | Canfield et al. |
| 5,850,352 A | 12/1998 | Moezzi et al. |
| 5,861,881 A | 1/1999 | Freeman et al. |
| 5,864,549 A | 1/1999 | Honkasalo et al. |
| 5,870,465 A | 2/1999 | Hosbach et al. |
| 5,878,211 A | 3/1999 | Delagrange et al. |
| 5,880,732 A | 3/1999 | Tryding |
| 5,884,957 A | 3/1999 | Shoen et al. |
| 5,892,554 A | 4/1999 | DiCicco et al. |
| 5,894,320 A | 4/1999 | Vancelette |
| 5,912,700 A | 6/1999 | Honey et al. |
| 5,920,701 A | 7/1999 | Miller et al. |
| 5,922,073 A | 7/1999 | Shimada |
| 5,933,773 A | 8/1999 | Barvesten |
| 5,946,635 A | 8/1999 | Dominguez |
| D413,881 S | 9/1999 | Ida et al. |
| 5,949,484 A | 9/1999 | Nakaya et al. |
| 5,953,056 A | 9/1999 | Tucker |
| 5,953,076 A | 9/1999 | Astle et al. |
| 5,956,716 A | 9/1999 | Kenner et al. |
| 5,959,539 A | 9/1999 | Adolph et al. |
| 5,979,757 A | 11/1999 | Tracy et al. |
| 5,982,445 A | 11/1999 | Eyer et al. |
| 5,983,005 A | 11/1999 | Monteiro et al. |
| 5,990,958 A | 11/1999 | Bheda et al. |
| 5,991,382 A | 11/1999 | Bayless et al. |
| 5,991,399 A | 11/1999 | Graunke et al. |
| 5,991,498 A | 11/1999 | Young |
| 5,999,124 A | 12/1999 | Sheynblat |
| 5,999,808 A | 12/1999 | LaDue |
| 6,000,864 A | 12/1999 | Hanada |
| 6,002,720 A | 12/1999 | Yurt et al. |
| 6,002,995 A | 12/1999 | Suzuki et al. |
| 6,003,135 A | 12/1999 | Bialick et al. |
| 6,005,599 A | 12/1999 | Asai et al. |
| 6,005,611 A | 12/1999 | Gullichsen et al. |
| 6,005,927 A | 12/1999 | Rahrer et al. |
| 6,006,105 A | 12/1999 | Rostoker et al. |
| 6,009,336 A | 12/1999 | Harris et al. |
| 6,014,694 A | 1/2000 | Aharoni et al. |
| 6,016,348 A | 1/2000 | Blatter et al. |
| 6,021,433 A | 2/2000 | Payne et al. |
| 6,023,606 A | 2/2000 | Monte et al. |
| 6,026,119 A | 2/2000 | Funk et al. |
| 6,029,000 A | 2/2000 | Woolsey et al. |
| 6,034,621 A | 3/2000 | Kaufman |
| 6,034,716 A | 3/2000 | Whiting et al. |

(56) References Cited

U.S. PATENT DOCUMENTS

| | | |
|---|---|---|
| 6,043,837 A | 3/2000 | Driscoll, Jr. et al. |
| 6,049,718 A | 4/2000 | Stewart |
| 6,055,229 A | 4/2000 | Dorenbosch et al. |
| 6,058,106 A | 5/2000 | Cudak et al. |
| 6,058,422 A | 5/2000 | Ayanoglu et al. |
| 6,064,860 A | 5/2000 | Ogden |
| 6,069,648 A | 5/2000 | Suso et al. |
| 6,069,896 A | 5/2000 | Borgstahl et al. |
| D426,527 S | 6/2000 | Sakaguchi |
| 6,073,013 A | 6/2000 | Agre et al. |
| 6,073,124 A | 6/2000 | Krishnan et al. |
| 6,073,171 A | 6/2000 | Gaughan et al. |
| 6,075,812 A | 6/2000 | Cafarella et al. |
| 6,075,987 A | 6/2000 | Camp, Jr. et al. |
| 6,076,099 A | 6/2000 | Chen et al. |
| 6,076,167 A | 6/2000 | Borza |
| 6,078,954 A | 6/2000 | Lakey et al. |
| 6,085,112 A | 7/2000 | Kleinschmidt et al. |
| 6,095,423 A | 8/2000 | Houdeau et al. |
| 6,099,409 A | 8/2000 | Brenner et al. |
| 6,100,925 A | 8/2000 | Rosser et al. |
| 6,104,414 A | 8/2000 | Odryna et al. |
| 6,104,815 A | 8/2000 | Alcorn et al. |
| 6,108,365 A | 8/2000 | Rubin et al. |
| 6,111,863 A | 8/2000 | Rostoker et al. |
| 6,115,615 A | 9/2000 | Ota et al. |
| 6,118,493 A | 9/2000 | Duhault et al. |
| 6,121,966 A | 9/2000 | Teodosio et al. |
| 6,124,862 A | 9/2000 | Boyken et al. |
| 6,128,143 A | 10/2000 | Nalwa |
| 6,131,025 A | 10/2000 | Riley et al. |
| 6,133,946 A | 10/2000 | Cavallaro et al. |
| 6,137,525 A | 10/2000 | Lee et al. |
| 6,141,347 A | 10/2000 | Shaughnessy et al. |
| 6,144,375 A | 11/2000 | Jain et al. |
| 6,144,402 A | 11/2000 | Norsworthy et al. |
| 6,144,702 A | 11/2000 | Yurt et al. |
| 6,154,172 A | 11/2000 | Piccionelli et al. |
| 6,154,250 A | 11/2000 | Honey et al. |
| 6,167,092 A | 12/2000 | Lengwehasatit |
| 6,169,568 B1 | 1/2001 | Shigetomi |
| 6,173,317 B1 | 1/2001 | Chaddha et al. |
| 6,175,517 B1 | 1/2001 | Jigour et al. |
| 6,178,426 B1 | 1/2001 | Klein et al. |
| 6,182,084 B1 | 1/2001 | Cockrell et al. |
| 6,192,257 B1 | 2/2001 | Ray |
| 6,195,680 B1 | 2/2001 | Goldszmidt et al. |
| 6,204,843 B1 | 3/2001 | Freeman et al. |
| 6,215,484 B1 | 4/2001 | Freeman et al. |
| 6,222,937 B1 | 4/2001 | Cohen et al. |
| 6,227,974 B1 | 5/2001 | Eliat et al. |
| 6,252,586 B1 | 6/2001 | Freeman et al. |
| 6,256,019 B1 | 7/2001 | Allport |
| 6,269,483 B1 | 7/2001 | Broussard |
| 6,271,752 B1 | 8/2001 | Vaios |
| 6,278,884 B1 | 8/2001 | Kim |
| 6,285,889 B1 | 9/2001 | Nykänen et al. |
| 6,286,029 B1 | 9/2001 | Delph |
| 6,289,464 B1 | 9/2001 | Wecker et al. |
| 6,295,094 B1 | 9/2001 | Cuccia |
| 6,317,039 B1 | 11/2001 | Thomason |
| 6,317,776 B1 | 11/2001 | Broussard et al. |
| 6,356,661 B1 | 3/2002 | Wen |
| 6,359,902 B1 | 3/2002 | Putzolu |
| 6,360,101 B1 | 3/2002 | Irvin |
| 6,363,254 B1 | 3/2002 | Jones et al. |
| 6,366,614 B1 | 4/2002 | Pian et al. |
| 6,373,842 B1 | 4/2002 | Coverdale et al. |
| 6,379,059 B2 | 4/2002 | Kaplan |
| 6,385,772 B1 | 5/2002 | Courtney |
| 6,389,473 B1 | 5/2002 | Carmel et al. |
| 6,400,264 B1 | 6/2002 | Hsieh |
| 6,400,946 B1 | 6/2002 | Vazvan et al. |
| 6,405,371 B1 | 6/2002 | Oosterhout et al. |
| 6,424,369 B1 | 7/2002 | Adair et al. |
| 6,434,398 B1 | 8/2002 | Inselberg |
| 6,434,403 B1 | 8/2002 | Ausems et al. |
| 6,434,530 B1 | 8/2002 | Sloane et al. |
| 6,442,637 B1 | 8/2002 | Hawkins et al. |
| 6,443,840 B2 | 9/2002 | Von Kohorn |
| 6,456,334 B1 | 9/2002 | Duhault |
| 6,457,078 B1 | 9/2002 | Magro et al. |
| 6,466,202 B1 | 10/2002 | Suso et al. |
| 6,470,378 B1 | 10/2002 | Tracton et al. |
| 6,473,739 B1 | 10/2002 | Showghi et al. |
| 6,492,997 B1 | 12/2002 | Gerba et al. |
| 6,493,104 B1 | 12/2002 | Cromer et al. |
| 6,496,802 B1 | 12/2002 | van Zoest et al. |
| 6,496,980 B1 | 12/2002 | Tillman et al. |
| 6,498,865 B1 | 12/2002 | Brailean et al. |
| 6,515,988 B1 | 2/2003 | Eldridge et al. |
| 6,519,771 B1 | 2/2003 | Zenith |
| 6,522,352 B1 | 2/2003 | Strandwitz et al. |
| 6,525,762 B1 | 2/2003 | Mileski et al. |
| 6,526,034 B1 | 2/2003 | Gorsuch |
| 6,526,335 B1 | 2/2003 | Treyz et al. |
| 6,529,519 B1 | 3/2003 | Steiner et al. |
| 6,535,493 B1 | 3/2003 | Lee et al. |
| 6,549,624 B1 | 4/2003 | Sandru |
| 6,549,625 B1 | 4/2003 | Rautila et al. |
| 6,560,443 B1 | 5/2003 | Vaisanen et al. |
| 6,564,070 B1 | 5/2003 | Nagamine et al. |
| 6,564,380 B1 | 5/2003 | Murphy |
| 6,570,889 B1 | 5/2003 | Stirling-Gallacher et al. |
| 6,571,221 B1 | 5/2003 | Stewart et al. |
| 6,574,266 B1 | 6/2003 | Haartsen |
| 6,578,203 B1 | 6/2003 | Anderson, Jr. et al. |
| 6,579,203 B2 | 6/2003 | Wang et al. |
| 6,591,297 B1 | 7/2003 | Challener et al. |
| 6,602,191 B2 | 8/2003 | Quy |
| 6,603,977 B1 | 8/2003 | Walsh et al. |
| 6,608,633 B1 | 8/2003 | Sciammarella et al. |
| 6,615,186 B1 | 9/2003 | Kolls |
| 6,622,017 B1 | 9/2003 | Hoffman |
| 6,624,846 B1 | 9/2003 | Lassiter |
| 6,625,580 B1 | 9/2003 | Tayama |
| 6,631,522 B1 | 10/2003 | Erdelyi |
| 6,647,015 B2 | 11/2003 | Malkemes et al. |
| 6,657,654 B2 | 12/2003 | Narayanaswami |
| 6,658,019 B1 | 12/2003 | Chen et al. |
| 6,665,291 B1 | 12/2003 | Shahdad et al. |
| 6,669,346 B2 | 12/2003 | Metcalf |
| 6,675,386 B1 | 1/2004 | Hendricks et al. |
| 6,681,398 B1 | 1/2004 | Verna |
| 6,684,250 B2 | 1/2004 | Anderson et al. |
| 6,690,947 B1 | 2/2004 | Tom |
| 6,694,150 B1 | 2/2004 | Standke et al. |
| 6,697,018 B2 | 2/2004 | Stewart |
| 6,714,797 B1 | 3/2004 | Rautila |
| 6,728,518 B1 | 4/2004 | Scrivens et al. |
| 6,731,940 B1 | 5/2004 | Nagendran |
| 6,738,841 B1 | 5/2004 | Wolff |
| 6,741,250 B1 | 5/2004 | Furlan et al. |
| 6,751,221 B1 | 6/2004 | Saito et al. |
| 6,754,509 B1 | 6/2004 | Yu et al. |
| 6,757,262 B1 | 6/2004 | Weisshaar et al. |
| 6,757,740 B1 | 6/2004 | Parekh et al. |
| 6,766,036 B1 | 7/2004 | Pryor |
| 6,769,028 B1 | 7/2004 | Sass et al. |
| 6,769,127 B1 | 7/2004 | Bonomi et al. |
| 6,774,926 B1 | 8/2004 | Ellis et al. |
| 6,782,102 B2 | 8/2004 | Blanchard et al. |
| 6,813,608 B1 | 11/2004 | Baranowski |
| 6,819,354 B1 | 11/2004 | Foster et al. |
| 6,839,080 B2 | 1/2005 | Meyers |
| 6,853,851 B1 | 2/2005 | Rautiola et al. |
| 6,853,973 B2 | 2/2005 | Mathews et al. |
| 6,859,791 B1 | 2/2005 | Spagna et al. |
| 6,877,134 B1 | 4/2005 | Fuller et al. |
| 6,889,384 B1 | 5/2005 | Soloff |
| 6,895,216 B2 | 5/2005 | Sato et al. |
| 6,912,513 B1 | 6/2005 | Candelore |
| 6,931,290 B2 | 8/2005 | Forest |
| 6,934,510 B2 | 8/2005 | Katayama |

(56) References Cited

U.S. PATENT DOCUMENTS

| | | |
|---|---|---|
| 6,952,558 B2 | 10/2005 | Hardacker |
| 6,954,469 B1 | 10/2005 | Dygert |
| 6,965,868 B1 | 11/2005 | Bednarek |
| 6,968,012 B1 | 11/2005 | Meggers |
| 6,970,183 B1 | 11/2005 | Monroe |
| 6,970,678 B1 | 11/2005 | Ditzik |
| 6,985,588 B1 | 1/2006 | Glick et al. |
| 6,986,155 B1 | 1/2006 | Courtney et al. |
| 6,986,158 B1 | 1/2006 | Terui et al. |
| 6,992,702 B1 | 1/2006 | Foote et al. |
| 6,993,137 B2 | 1/2006 | Fransdonk |
| 7,010,492 B1 | 3/2006 | Bassett et al. |
| 7,015,954 B1 | 3/2006 | Foote et al. |
| 7,024,677 B1 | 4/2006 | Snyder et al. |
| 7,037,198 B2 | 5/2006 | Hameen-Anttila |
| 7,080,153 B2 | 7/2006 | Monteiro et al. |
| 7,106,360 B1 | 9/2006 | Frederick |
| 7,124,425 B1 | 10/2006 | Anderson, Jr. et al. |
| 7,133,837 B1 | 11/2006 | Barnes, Jr. |
| 7,149,253 B2 | 12/2006 | Hosur |
| 7,149,549 B1 | 12/2006 | Ortiz et al. |
| 7,162,532 B2 | 1/2007 | Koehler et al. |
| 7,174,308 B2 | 2/2007 | Bergman et al. |
| 7,191,462 B1 | 3/2007 | Roman et al. |
| 7,193,645 B1 | 3/2007 | Aagaard et al. |
| 7,196,722 B2 | 3/2007 | White et al. |
| 7,229,354 B2 | 6/2007 | McNutt et al. |
| 7,257,158 B1 | 8/2007 | Figueredo et al. |
| 7,321,783 B2 | 1/2008 | Kim |
| 7,376,388 B2 | 5/2008 | Ortiz et al. |
| 7,379,886 B1 | 5/2008 | Zaring et al. |
| 7,448,063 B2 | 11/2008 | Freeman et al. |
| 7,451,401 B2 | 11/2008 | Tanskanen et al. |
| 7,486,943 B2 | 2/2009 | Choti et al. |
| 7,487,112 B2 | 2/2009 | Barnes, Jr. |
| 7,603,321 B2 | 10/2009 | Gurvey |
| 7,620,426 B2 | 11/2009 | Ortiz et al. |
| 7,630,721 B2 | 12/2009 | Ortiz |
| 7,683,937 B1 | 3/2010 | Blumenfeld |
| 7,712,125 B2 | 5/2010 | Herigstad et al. |
| 7,782,363 B2 | 8/2010 | Ortiz |
| 7,792,297 B1 | 9/2010 | Piccionelli et al. |
| 7,796,162 B2 | 9/2010 | Ortiz |
| 7,812,856 B2 | 10/2010 | Ortiz et al. |
| 7,826,877 B2 | 11/2010 | Ortiz et al. |
| 7,884,855 B2 | 2/2011 | Ortiz |
| 7,945,935 B2 | 5/2011 | Stonedahl |
| 7,962,948 B1 | 6/2011 | Girouard et al. |
| 8,024,186 B1 | 9/2011 | De Bonet |
| 8,051,453 B2 | 11/2011 | Arseneau et al. |
| 8,086,184 B2 | 12/2011 | Ortiz et al. |
| 8,087,054 B2 | 12/2011 | Zacks et al. |
| 8,090,321 B2 | 1/2012 | Ortiz et al. |
| 8,165,598 B2 | 4/2012 | Tran et al. |
| 8,184,169 B2 | 5/2012 | Ortiz |
| 8,270,895 B2 | 9/2012 | Ortiz et al. |
| 8,319,845 B2 | 11/2012 | Ortiz |
| 8,320,820 B2 | 11/2012 | Ortiz |
| 8,401,460 B2 | 3/2013 | Ortiz et al. |
| 8,433,278 B2 | 4/2013 | Adams et al. |
| 8,464,302 B1 | 6/2013 | Liwerant et al. |
| 8,583,027 B2 | 11/2013 | Ortiz et al. |
| 8,588,815 B2 | 11/2013 | Kenyon |
| 8,610,786 B2 | 12/2013 | Ortiz |
| 8,724,484 B2 | 5/2014 | Jones et al. |
| 8,750,784 B2 | 6/2014 | Ortiz et al. |
| 9,031,537 B2 | 5/2015 | Ortiz et al. |
| 2001/0018663 A1 | 8/2001 | Dussell et al. |
| 2001/0025239 A1 | 9/2001 | Hakenberg et al. |
| 2001/0040671 A1 | 11/2001 | Metcalf |
| 2001/0041599 A1 | 11/2001 | Pirkola et al. |
| 2001/0042105 A1 | 11/2001 | Koehler et al. |
| 2001/0045978 A1 | 11/2001 | McConnell et al. |
| 2001/0047441 A1 | 11/2001 | Robertson |
| 2001/0048685 A1 | 12/2001 | Park et al. |
| 2002/0018124 A1 | 2/2002 | Mottur et al. |
| 2002/0023010 A1 | 2/2002 | Rittmaster et al. |
| 2002/0023123 A1 | 2/2002 | Madison |
| 2002/0046084 A1 | 4/2002 | Steele et al. |
| 2002/0049979 A1 | 4/2002 | White et al. |
| 2002/0053078 A1 | 5/2002 | Holtz et al. |
| 2002/0058499 A1 | 5/2002 | Ortiz |
| 2002/0069419 A1 | 6/2002 | Raverdy et al. |
| 2002/0099854 A1 | 7/2002 | Jorgensen |
| 2002/0109706 A1 | 8/2002 | Lincke et al. |
| 2002/0115454 A1 | 8/2002 | Hardacker |
| 2002/0156708 A1 | 10/2002 | Ronen |
| 2002/0176000 A1 | 11/2002 | Katayama |
| 2002/0177449 A1 | 11/2002 | McDonnell et al. |
| 2002/0186668 A1 | 12/2002 | Thomason |
| 2002/0188943 A1 | 12/2002 | Freeman et al. |
| 2003/0011805 A1 | 1/2003 | Yacoub |
| 2003/0036350 A1 | 2/2003 | Jonsson et al. |
| 2003/0036408 A1 | 2/2003 | Johansson et al. |
| 2003/0040303 A1 | 2/2003 | Nelson et al. |
| 2003/0041334 A1 | 2/2003 | Lu |
| 2003/0046108 A1 | 3/2003 | Labadie |
| 2003/0061294 A1 | 3/2003 | Stennicke |
| 2003/0093797 A1 | 5/2003 | Bazzaz |
| 2003/0105845 A1 | 6/2003 | Leermakers |
| 2003/0112354 A1 | 6/2003 | Ortiz et al. |
| 2003/0156540 A1 | 8/2003 | Trossen et al. |
| 2003/0172375 A1 | 9/2003 | Shaw et al. |
| 2003/0189589 A1 | 10/2003 | LeBlanc et al. |
| 2003/0210329 A1 | 11/2003 | Aagaard et al. |
| 2004/0073437 A1 | 4/2004 | Halgas, Jr. et al. |
| 2004/0098748 A1 | 5/2004 | Bo et al. |
| 2005/0046698 A1 | 3/2005 | Knight |
| 2005/0060751 A1 | 3/2005 | Glaser |
| 2005/0246752 A1 | 11/2005 | Liwerant et al. |
| 2006/0047774 A1 | 3/2006 | Bowman et al. |
| 2006/0104600 A1 | 5/2006 | Abrams |
| 2006/0170778 A1 | 8/2006 | Ely et al. |
| 2006/0174297 A1 | 8/2006 | Anderson et al. |
| 2006/0203770 A1 | 9/2006 | Kjellberg |
| 2006/0288375 A1 | 12/2006 | Ortiz et al. |
| 2007/0005795 A1 | 1/2007 | Gonzalez |
| 2007/0015586 A1 | 1/2007 | Huston |
| 2007/0019068 A1 | 1/2007 | Arseneau et al. |
| 2007/0067446 A1 | 3/2007 | Jones et al. |
| 2007/0129817 A1 | 6/2007 | Cadiz et al. |
| 2007/0188611 A1 | 8/2007 | Carter |
| 2007/0240190 A1 | 10/2007 | Arseneau et al. |
| 2007/0275746 A1 | 11/2007 | Bitran |
| 2008/0016534 A1 | 1/2008 | Ortiz et al. |
| 2008/0040753 A1 | 2/2008 | Anandpura et al. |
| 2008/0254811 A1 | 10/2008 | Stewart |
| 2008/0270567 A1 | 10/2008 | Stiers et al. |
| 2008/0271082 A1 | 10/2008 | Carter et al. |
| 2009/0017749 A1 | 1/2009 | Braun |
| 2009/0047992 A1 | 2/2009 | Ortiz et al. |
| 2009/0237505 A1 | 9/2009 | Ortiz et al. |
| 2009/0262136 A1 | 10/2009 | Tischer et al. |
| 2010/0188485 A1 | 7/2010 | Abrams |

FOREIGN PATENT DOCUMENTS

| | | |
|---|---|---|
| EP | 1 113 669 A2 | 7/2001 |
| WO | 9935827 A1 | 7/1999 |
| WO | WO 00/04732 A1 | 1/2000 |
| WO | 0016544 A2 | 3/2000 |
| WO | 0072574 A2 | 11/2000 |
| WO | WO 00/77979 A2 | 12/2000 |
| WO | 0103088 A1 | 1/2001 |
| WO | 0106791 A1 | 1/2001 |
| WO | 0110128 A1 | 2/2001 |
| WO | 0114981 A1 | 3/2001 |
| WO | 0115450 A1 | 3/2001 |
| WO | 0117262 A1 | 3/2001 |
| WO | 0131497 A1 | 5/2001 |
| WO | 0180559 A2 | 10/2001 |
| WO | 0198903 A1 | 10/2001 |

(56) References Cited

FOREIGN PATENT DOCUMENTS

OTHER PUBLICATIONS

U.S. Appl. No. 10/940,259, filed Sep. 13, 2004, Kenyon.
U.S. Appl. No. 95/001,565, filed Mar. 4, 2011, Ortiz et al.
U.S. Appl. No. 95/001,566, filed Mar. 7, 2011, Ortiz et al.
U.S. Appl. No. 95/001,567, filed Mar. 7, 2011, Ortiz et al.
U.S. Appl. No. 95/001,568, filed Mar. 7, 2011, Ortiz et al.
U.S. Appl. No. 95/002,393, filed Sep. 15, 2012, Ortiz et al.
U.S. Appl. No. 60/136,589, filed May 28, 1999, Tanskanen et al.
U.S. Appl. No. 60/191,003, filed Mar. 21, 2000, Rittmaster et al.
U.S. Appl. No. 60/194,761, filed Apr. 3, 2000, Herringshaw et al.
U.S. Appl. No. 60/205,942, filed May 18, 2000, Kaiman et al.
U.S. Appl. No. 60/212,125, filed Jun. 16, 2000, Fransdonk.
U.S. Appl. No. 60/230,667, filed Sep. 7, 2000, Anders et al.
U.S. Appl. No. 60/233,771, filed Sep. 19, 2000, Stennicke.
U.S. Appl. No. 60/241,776, filed Oct. 18, 2000, Doctor et al.
U.S. Appl. No. 60/243,561, filed Oct. 26, 2000, Ortiz et al.
U.S. Appl. No. 60/250,944, filed Dec. 1, 2000, Davies et al.
U.S. Appl. No. 60/250,947, filed Dec. 1, 2000, Davies et al.
U.S. Appl. No. 09/887,492, filed Jun. 22, 2001, Ortiz.
U.S. Appl. No. 09/902,348, filed Jul. 10, 2001, Ortiz et al.
U.S. Appl. No. 12/257,205, filed Oct. 23, 2008, Ortiz et al.
Adamson, W. A., et al., "Secure Distributed Virtual Conferencing: Multicast or Bust," *CITI Technical Report 99-1*, Center for Information Technolody Integration, University of Michigan, Ann Arbor, Jan. 25, 1999, pp. 1-7.
"Advisory/Be Here Corporation Gives Consumers Up Close View of the Summer X-Games with 360-Degree Internet Coverage," Business Wire, Aug. 17, 2000, 3 pages.
AdiveSky System, 1999-2001, printed Apr. 12, 2006, 1 page.
Alderton, M., The Bluetooth question, Mobile Dev & Design, Jan. 1, 2001, 5 pages.
Alm, R., "New Arena a Technical Marvel," *The Dallas Morning News*, Oct. 15, 2000, pp. 1-6.
Almeida, J. M. et al., Analysis of Educational Media Server Workloads, Proceedings of the 11th International Workshop on Network and Operating Systems Support for Digital Audio and Video, Port Jefferson, NY, Jun. 25-26, 2001, 10 pages.
Alven, D. et al., Does it take a WISP to manage a wisp of hotspots—Analysis of the WLAN market from a WISP perspective, Master Thesis, Royal Institute of Technology, Stockholm, Feb. 2002, 117 pages.
Apostolopoulos, J. G. et al., Video streaming: Concepts, Algorithms, and Systems, Hewlett-Packard Company, Sep. 18, 2002, 25 pages.
Appeal Decision and Transcript, U.S. Appl. No. 10/620,098, dated Jan. 29, 2010 and Feb. 2, 2010, 19 pages.
Aramvith, S. et al., A Coding Scheme for Wireless Video Transport with Reduced Frame-Skipping, SPIE Proceedings of Visual Communications and Image Processing (2000) 4067, 9 pages.
Asbun, E. et al., Real-time Error Concealment in Compressed Digital Video Streams, Picture Coding Symposium, 1999, 4 pages.
Austen, News Watch; Samsung Puts a Colorful Twist on Its Handheld-Phone Hybrid, http://www.nytimes.com/2001/04/19/technology/news-watch-samsung-puts-a-colorful-twist-on-its-handheld-phone-hybrid.html, Apr. 19, 2001.
Baldocchi, Palo Alto Patch, AT&T Gives Stanford Stadium Wi-Fi Stanford becomes the first campus to offer Wi-Fi access in all of its sporting venues, http://paloalto.patch.com/articles/att-gives-stanford-stadium-wifi-access, May 20, 2011.
Barbero, M. et al., "A Bit-Rate Reduction System for HDTV Transmission," IEEE Transactions on Circuits and Systems for Video Technology (1991) 1(1):4-13.
"Bassett", Response to Office Action dated Sep. 17, 2002 (15 pages).
Batra, P. et al., Effective algorithms for video transmission over wireless channels, Signal Processing: Image Communication (1998) 12(2):147-168 abstract.

Battista, et al., "MPEG-4: A Multimedia Standard for the Third Millennium, Part 1," 1070-986X/99, *IEEE* (1999) pp. 74-83.
Begun, Newsweek, Baseball Good Eye, http://www.immersionwireless.com/newsweek.pdf, Apr. 8, 2002.
Bergstein, B., "Click Me Out to the Ballgame, Web-Wired Stadiums Aim to Spur Evolution of Spectator Sports," *Las Vegas Review Journal*, Online Edition, Oct. 20, 2000, pp. 1-4.
Bergstein, B., "Having a Ball with Technology, High-Tech Firms Teaming up with Pro Sports Venues," www.abcnews.com, Sep. 27, 2000, pp. 1-2.
Billinghurst, K., "Wireless Internet adds a new dimension," Contact Magazine (1999) No. 14, Ericsson, Exhibit 2 of Case No. 1:10-cv-00433-JB-KBM, 3 pages.
Bjork, S. et al., WEST: A Web Browser for Small Terminals, UIST (1999) Asheville, NC, CHI Letters 1(1):187-196.
Blum, Huffington Post, Baseball Instant Reply to Begin Thursday, http://www.huffingtonpost.com/2008/08/26/baseball-instant; Aug. 26, 2008.
Boyter, S., "Product likely to be home run with sports fans," *DFW TechBiz*, Aug. 21, 2000, pp. 1-3.
Boyter, S., Dallas-Fort Worth Tech Biz, Front Row Takes a Look at the Old ball Game, Jul. 16, 2001, United States.
Bradshaw, M. K. et al., Periodic Broadcast and Patching Services—Implementation, Measurement, and Analysis in an Internet Streaming Video Testbed, SIGMM (2001) Ottawa, Ontario, Canada, 14 pages.
Braff, MLB Network Covers All MLB Clubs, 1,800 Clubs for '30 Clubs in 30 Days', http://sportsvideo.org/main/blog/2011/03/21/mlb-network-covers-all-mlb-clubs-1800-miles-for-%e2%80%9830-clubs-in-30-days%e2%80%99/, Mar. 21, 2011.
Braves Join the Insider Team, http://www.immersionwireless.com/attbusinesschronicle.pdf, created Aug. 23, 2005.
Broadcasting, Wikipedia, http://en.wikipedia.org/wiki/Broadcasting#cite_note-0 (Accessed May 25, 2011).
Byers, J. W. et al., A Digital Fountain Approach to Relieable Distribution of Bulk Data, Proceedings of the ACM SIGCOMM Conference on Applications, technologies, architectures, and protocols for computer communication (1998) New York, NY, pp. 56-67.
Campbell, A. T., QOS-aware Middleware for Mobile Multimedia Communications, Multimedia Tools and Applications (1998) 7:67-82.
Capin, et al., "Efficient Modeling of Virtual Humans in MPEG-4," 0-7803-6536-4/00, *IEEE* (2000), pp. 1-4.
Carnoy, D., "LG TP3000" *CNET Wireless*, Aug. 17, 2000, pp. 1-2.
Carroll, K., "Fans take to ChoiceSeats: Interactive technology, e-commerce expand to sporting events," *Telephony Online*, Jan. 10, 2000, 2 pgs.
Celik, M., Digital Video Transmission over Wireless Channels, Apr. 30, 2000, 13 pages.
Chalmers, M. et al., Designing the augmented stadium, Department of Computing Sciences, University of Glasgow, 2006, 8 pages.
Chandra, S., Wireless Network Interface Energy Consumption: Implications for Popular Streaming Formats, Multimedia Systems (2003) 9(2):185-201.
Chang, S.-F et al., Real-Time Content-Based Adaptive Streaming of Sports Video, IEEE Workshop on Content-Based Access of Image and Video Libraries (2001) Kauai, HI, pp. 139-146.
Chawathe, Y. D., Scattercast: An Architecture for Internet Broadcast Distribution as an Infrastructure Service, Dissertation, Doctor of Philosophy in Computer Science, University of California, Berkeley, Fall 2000, 161 pages.
Chen, S. et al., Distributed Quality-of-Service Routing in Ad Hoc Networks, IEEE Journal on Selected Areas in Communications (1999) 17(8):1488-1505.
Chen, MP3 Player s in the Year 2000 Were Not So Good (But We Still Loved Them) http://gizmodo.com/5437243/mp3-players-in-the-year-2000-were-not-so-good-but-we-still-loved-them, (Dec. 30, 2009).
Cherriman, P. et al., "Orthogonal Frequency-Division Multiplex Transmission of H.263 Encoded Video over Highly Frequency-Selective Wireless Networks," IEEE Transactions on Circuits and Systems for Video Technology (1999) 9(5):701-712.

(56) References Cited

OTHER PUBLICATIONS

Childers, L. et al., ActiveSpaces on the Grid: The Construction of Advanced Visualization and Interaction Environments, Simulation and Visualiation on the Grid, vol. 13 of the series Lecture Notes in Computational Sciences and Engineering (2000) Springer-Verlag, Berlin, pp. 64-80.
"ChoiceSeat, Live Interactive Event Entertainment," www.choiceseat.com, Oct. 15, 2000 pp. 1-5.
Chow, R. K.Y. et al., Scalable Video Delivery to Unicast Handheld-based Clients, IEEE International Conference on Networks Sep. 5-8, 2000, pp. 93-98.
CNET, Shakeware, http://download.cnet.com/MP3-Player-2000/3000-2133_4-10040702.htm (Feb. 28, 2000).
CNET, "Cell phone video start-up files for IPO" http://news.cnet.com/Cell-phone-video-start-up-files-for-IPO/2100-1033_3-238076.html (Mar. 16, 2000).
"Contactless Applications for PDAs"; Inside Technologies, Cartes 2000, Aug. 2000, pp. 1-14.
IDS initialed by Examiner acknowledged Dec. 5, 2011.
Crouch, PCWorld, Cyber Super Bowl Hast Its Limits, Web sites and wireless services bring football to your PC or PDA, but TV has a lock on the field, http://www.pcworld.com/article/38905/cyber_super_bowl_has_its_limits.html, Jan. 18, 2001.
Dachman, J., Sports Video Group, NBA Digital's Perez on Cord Cutting: Adapt or 'Risk Losing a Generation of Fans', Published May 13, 2011, http://sportsvideo.org/main/blog/2011/05/13/nba-digital%E2%80%99s-perez-on-cord-cutting-adapt-or-%E2%80%98risk-losing-an-entire-generation-of-fans%E2%80%99/.
De, P. et al., WiVision: A Wireless Video System for Real-Time Distribution and On-Demand Playback, First IEEE Consumer Communication and Networking Conference (2004) Las Vegas, NV, Jan. 5-8, pp. 575-580.
Derose. J. F., The Wireless Data Handbook, Fourth Edition, John Wiley & Sons, Inc., New York, 1999, 395 pages.
Dierks, T. et al., "The TLS Protocol Version 1.0," Network Working Group (1999) The Internet Soriety, 160 pages.
Dittmann, J. et al. (eds.), "Multimedia and Security," Workshop at ACM Multimedia '98, Sep. 12-13, Bristol, U.K., 137 pages.
Dunkels, A., Minimal TCP/IP implementation with proxy support, SICS Technical Report, T2001:Feb. 20, 2001, 81 pages.
Easton, J., Going Wireless: Revolutionize Your Business with Mobile Technology, Harper Information (2002) abstract.
Elsen, I. et al., Streaming Technology in 3G Mobile Communication Systems, Computer Sep. 2001, pp. 46-52.
Engman, A., High Performace Video Streaming on Low End Systems, M. Sc. Thesis in Electrical Engineering, Telia Research AB, Nattjanster Division, Stockholm, Dec. 1999, 47 pages.
New Ericsson demo facility lets visitors test drive 3G wireless internet, Ericsson Press Release, Jul. 20, 1999, 1 page.
Ericsson Press Release, Creating new possibilities for mobile multimedia broadcasting, Oct. 11, 1999, 3 pages.
Ericsson Stages Live Global ECDMA Multi-party Link-up, Business Wire, Feb. 24, 2000, 2 pages.
Erlandson, C. et al., WAP—The wireless application protocol, Ericsson Review (1998)4:150-153.
E-Stadium Fans have the game in the palms of their hands, Sep. 30, 2005, 1 page.
EvanyK FCC, Reply to the American Power Association in the matter of Carrier Current Systems including Broadband over Power Line Systems (Jun. 21, 2004).
FCC 00-289, Annual Report and Analysis of Competitive Market Conditions with Respect to Commercial Mobile Services, Fifth Report, Aug. 3, 2000, 183 pages.
Fitzek, F. H. P. et al., A Prefetching Protocol for Continuous Media Streaming in Wireless Environments, IEEE Journal on Selected Areas in Communications (2001) 19(10):2015-2028.
Forman, G. H., et al., The Challenges of Mobile Computing, Computer (1994) 27(4):38-47.

Frankhauser, G. et al., The WaveVideo System and Network Architecture: Design and Implementation, TIK Technical Report No. 44 Jun. 1998, 28 pages.
Frodigh, M. et al., Future-Generation Wireles Networks, IEEE Personal Communications Oct. 2001, pp. 10-17.
George,. T., "PDAs Bring Sports Fans Closer to Athletes," InformationWeek Dec. 14, 2001 http://www.informationweek.com/pdas-bring-sports-fans-closer-to-athlete/6508218, Exhibit 4 of Case No. 1:10-cv-00433-00433-JB-KBM, 2 pages.
Girod, B. et al., Scalable Video Coding with Multiscale Motion Compensation and Unequal Error Protection, Multimedia Communications and Video Coding Part III (1996) Springer US, New York, pp. 475-482.
Girod, B. et al., Feedback-Based Error Control for Mobile Video Transmission, Proceedings of the IEEE (1999) 87(10):1707-1723.
Girod, B. et al., Chapter 12: Wireless Video, Compress Video Over Networks, Sun, M.-T. et al. (eds.), Nov. 14, 1999, 38 pages.
Glenn, R. et al., Wireless Information Technology for the 21st Century, Information Technology Laboratory, National Institute of Standards and Technology, Feb. 17, 1999, 64 pages.
Goodman, D. J., The Wireless Internet Promises and Challenges, Computer Jul. 2000, pp. 36-41.
Gordon, K., "Interactive Broadband Video at the Garden," *Digital Video Magazine* Apr. 2000, 11 pages.
Greenman, New York Times, What's Next; Next Step for Cell Phones: Adding Pictures to the Conversation, http://select.nytimes.com/qst/abstract.html?res=E40E17FD34580C768EDDA80894D9404482, Jan. 25, 2001.
Griffioen, J. et al., Experience Developing Wireless Networks for Interactive Multimedia Instructions, 28th Annual Frontiers in Education Conference (1998) Tempe, AZ, Nov. 4-7, pp. 1005-1010 vol. 3.
Gunnarsson, M., Enabling Multi-Access Services with the Always Best Connected Concept, Ericsson Oct. 2003, 17 pages.
Gupta, P. et al., The Capacity of Wireless Networks, IEEE Transactions on Information Theory (2000) 46(2):388-404.
Gussow, D., "Sittin' in the captain's chair," *St. Petersburg Times* Mar. 30, 1998 4 pages.
Hayden, T., Vivid Sky Launches SkyBOX for Major League Sports Fans at Demofall Feb. 8, 2006, 1 page.
Heinzelman, W. B., Application-Specific Protocol Architectures for Wireless Networks, Doctor of Philosophy, Massachusetts Institute of Technology, Jun. 2000, 154 pages.
Hibbert, L., "Decision you can't argue with," *Professional Engineering* Jul. 7, 1999, 12(13):26-27.
Higgins, Region Focus, Virtual Vrooml http://www.immersionwireless.com/regionfocus.pdf, created Aug. 23, 2005.
Holbrook, H. W. et al., IP Multicast Channels: Express Support for Large-scale Single-source Applications, Proceedings of the Conference on Applications Technologies, Architectures, and Protocols for Computer Commimication (1999) New York, pp. 65-78.
Holmquist, L. E., Breaking the Screen Barrier, Gothenburg Studies in Informatics, Report 16 May 2000, Depart of Informatics, Goteborg University, Sweden, 152 pages.
Horn, U. et al., Scalable Video Coding for Multimedia Applications and Robust Transmission over Wireless Channels, 7th International Workshop on Packet Video (1996) pp. 43-48.
Horn, B., Sports in America: Instant Replay's Success Wasn't Immediate for Verna, The Dallas Morning News, Sunday, Jan. 25, 2998, United States.
IEEE Std 802.11-1997, Part 11: Wireless LAN Medium Access Control (MAC) and Physical Layer (PHY) Specifications, Jun. 26, 1997, 459 pages.
IEEE Computer Society, "IEEE Standard Glossary of Computer Networking Terminology," Jun. 30, 1995 (7pages).
IEEE Computer Society, IEEE Std 802.11a-1999(R2003), "Part 11: Wireless LAN Medium Access Control (MAC) and Physical Layer (PHY) specifications. High-speed Physical Layer in the 5 GHz Band." 1999 (91 pages).
IEEE Computer Society, IEEE Std 802.11b-1999(R2003), "Part 11: Wireless LAN Medium Access Control (MAC) and Physical Layer

(56) References Cited

OTHER PUBLICATIONS (PHY) specifications: Higher-speed Physical Layer Extension in the 2.4 GHz band." 2000 (96 pages).
International Telecommunication Union, "Data Networks and Open System Communications Open Systems Interconnection—Model and Notation ITU-T Recommendation X.200," Jul. 1994 (63 pages).
Isidore, C., Baseball's secret $uccess $tory, CNNMoney.com. Dec. 23, 2005, 3 pages.
Iwata, A. et al, Scalable Routing Strategies for Ad Hoc Wireless Networks, IEEE Journal on Selected Areas in Communications (1999) 17(8):1369-1379.
Jason, Yankee Stadium Will Continue to be Safe from iPads and Kindles, http://itsaboutthemoney.net/archives/2011/03/28/yankee-stadium-will-continue-to-be-safe-from-ipads-and-kindles/, Mar. 28, 2011.
Jiang, Z. et al., Incorporation Proxy Services into Wide Area Cellular IP Networks, IEEE Wireless Communications and Networking Conference (2000) Chicago, IL, Sep. 23-28, pp. 246-252.
Johnson, D. B., Dynamic Source Routing in Ad Hoc Wireless Networks, Mobile Computing (1996) Springer, Imielinski T. et al. (eds.), pp. 153-181.
Johnson, The Guardian.co.uk, Ten Years of Technology 2000, http://www.guardian.co.uk/technology/blog/2009/dec/11/technology-decade-2000?intmp=239, Dec. 11, 2009, San Francisco, California, USA.
Johnston, A. et al., Ericsson's WebOnAir Information Server, Ericsson Review (2000) 4:264-274.
Jonsson, L.-E., RObust Checksum-based header COmpression (ROCCO), Ericsson Research, Sweden, Nov. 9, 1999, 17 pages.
Kalva, H. et al., Implementing Multiplexing, Streaming, and Server Interaction for MPEG-4, IEEE Transactions on Circuits and Systems for Video Technology (1999) 9(8):1299-1312.
Katkere, A. et al., Multiple Perspective Interactive Video, International Joint Conference on Artificial Intelligence (1995) 14(2):2063-2064.
Katz, R. H., Adaptation and Mobility in Wireless Information Systems, IEEE Personal Communications (1995) 1:6-17.
Kellerer, W. et al., IP based enhanced Data Casting Services over Radio Broadcast Networks, 1st European Conference on Universal Multiservice Networks (2000) Colmar, Oct. 2-4, pp. 195-203.
Kent, S. et al., Network Working Group, RFC 2401, Security Architecture for the Internet Protocol, Nov. 1998, 66 pages.
Kent, S. et al., Network Working Group, RFC 2402, IP Authentication Header, Nov. 1998, 22 pages.
Kieskowski, StreamingMedia.com, Content Prophets: Floating Balloons for Wireless Content, http://www.streamingmedia.com/Articles/ReadArticle.aspx?ArticleID=64198&PageNum=2, Jun. 6, 2001.
Kovisto, A., Multimedia Presentation and Transmission Standards and Their Support for Automatic Analysis, Conversion and Scaling: A Survey, Language and Media Processing Laboratory Mar. 2000, LAMP-TR-039, 46 pages.
Kozamernik, F., Media Streaming over the Internet—an overview of delivery technologies, EBU Technical Review Oct. 2002, 15 pages.
Kuri, J. et al., Reliable Multicast in Multi-access Wireless LANS, Eighteenth Annual Joint Conference of the IEEE Computer and Communications Societies (1999) New York, Mar. 21-25, pp. 760-767 vol. 2.
Larzon, L. -A., A Lighter UDP, Thesis, Division of Computer Communications, Depart. of Computer Science and Electrical Engineering, Lulea University of Technology, Lulea, Sweden, Dec. 1999, 55 pages.
Latour, A., New Video Technology Lets Users Manipulate What They Watch, The Wall Street Journal, Dec. 7, 2000, 4 pages.
Lauterbach, T., et al., "Multimedia Environment for Mobiles (MEMO)—Interactive Multimedia Services to Portable and Mobile Terminals," Robert Bosch Multimedia-Systems GmbH & Co., KG., Hildesheim, Germany, 1997, pp. 1-6.

Lee, S.-J. et al., Ad hoc Wireless Multicast with Mobility Prediction, Eight International Conference on Computer Communications and Networks (1999) Boston, MA, Oct. 11-13, pp. 4-9.
Lee, S.-J. et al., A Performance Comparison Study of Ad Hoc Wireless Multicast Protocols, IEEE INFOCOM (2000), pp. 565-574.
Lee, H. et al., Fischlar on a PDA: Handheld User Interface Design to a Video Indexing, Browsing and Playback System, International Conference on Universal Access in Human-Computer Interaction (2001) New Orleans, LA, Aug. 5-10, 5 pages.
Lewiston Morning Tribute, Apr. 30, 2002. http://news.google.com/newspapers?id=cqF1AAAAIBAJ&sjid=EDIMAAAAIBAJ&pg=3406.4067799.
Li, A. H., et al. (eds.), Video Streaming Services—Stage 1, 3rd Generation Partnership Project 2, Version 1.0, Jul. 10, 2000, 18 pages.
Marriott, M., "Video Technology to Make the Head Spin," The New York Times, Mar. 2, 2000, 2 pages.
Mauve, M. et al., An Application Developer's Perspective on Reliable Multicast for Distributed Interactive Media, ACM SIGCOMM Computer Communication Review Jul. 2000, 12 pages.
MemoryStock.com, http://www.memorystock.com/ram/IBMWorkPadz50RAM.html, RAM upgrade for IBM Workpad z50 Laptops (5o a maximum 48Mb RAM).
Merriam-Webster, Incorporation, "Merriam-Webster's Collegiate Dictionary," 10th Edition, Springfield, MA, 1998, p. 583.
Microsoft Computer Dictionary, Fifth Edition, p. 232 and 304, Microsoft Press, Redmond, WA 2002.
Microsoft NetShow—A Now outdated Active Streaming and RealMedia A/V tool Note: NetShow has been supplanted by the new Windows Media Player, ServerWatch, Jun. 25, 2002, 3 pages.
"Microsoft Windows Embedded, CE Product information," Microsoft.com, Feb. 6, 2001 (3 pages).
MLB Press Release, http://mlb.mlb.com/news/article.isp?ymd=20101212&content_id=16309080&c_id=mlb, Dec. 12, 2010.
MLB Press Release, MLB to launch limited instant replay on Thursday, Aug. 28, http://mlb.mlb.com/content/printer_friendly/mlb/V2008/m08/, Aug. 26, 2008.
MobiTV, https://www.mobitv.com, printed Apr. 15, 2016, 10 pages.
Montelius, F. et al., Streaming Video in Wireless Networks—Service and Technique, Thesis, Linkoping Department of Electrical Engineering, Dec. 11, 2001, Linkoping, Sweden, 126 pages.
Mooij, W., "Advances in Conditional Access Technology," International Broadcasting Convention (1997) Sep. 12-16, Conference Publication No. 447, pp. 461-464.
Moura, J. M. F. et al., Retrieving quality video across heterogenous networks—Video over Wireless, IEEE Personal Communications (1996) 3(1):44-54.
Mowery, J., "What's the Difference Between 60Hz and 120Hz?" http://www.ledtv.org/content/whats-difference-between-60hz-and-120hz, (Nov. 17, 2010).
Nedovic, V. et al., Delivery of Near Real-Time Soccer Match Highlights to Wireless PDA Devices, Dec. 2002, 6 pages.
NetAid, Wikipedia—the free encyclopedia, printed Apr. 15, 2016, 3 pages.
NFL, http://www.nfl.com/kickoff/sotry/09000d5d601e3eb1/article/new-rules-for-2007/, United States.
Nguyen, The Stanford Daily, Athletics Venues to Feature Wi-Fi, http://www.standforddaily.com/2011/05/23/athletics-venues-to-feature-wi-fi/, May 23, 2011.
Nilsson, T., Toward third-generation mobile multimedia communication, Ericsson Review No. 3 (1999) pp. 122-131.
Norris, The Guardian.co.uk, Mobile Matters, http://www.guardian.co.uk/technology/2002/dec/12/mobilephones.onlinesupplement/print, Dec. 12, 2002, UK.
Norris, The Guardian.co.uk, Phone firms race 3G Headache, http://www.guardian.co.uk/technology/2004/feb/28/mobilephones/ashleynorris/print, Feb. 28, 2004, UK.
Norris, The Guardian.co.uk, Mobile Phones Steal the Show, http://www.guardian.co.uk/technology/2004/mar/22/mobilephones.onlinesupplement/print, Mar. 22, 2004, UK.

(56) References Cited

OTHER PUBLICATIONS

Office Actions dated Feb. 3, 2009, Aug. 19, 2009, Apr. 13, 2010, and Feb. 14, 2011 in U.S. Appl. No. 10/015,458 (141 pages).
Office Action dated Nov. 6, 2015 in U.S. Appl. No. 14/259,899.
Ogunnaike, Concertgoers Multitasking to Stravinsky, New York Times, Published May 29, 2004.
Ojala, T. et al., Mobile Karpat—A Case Study in Wireless Personal area Networking, MUM Oct. 27-29, 2004, College Park, MA,8 pages.
Opera Glass Network, http://www.operaglassnetworks.com, printed Apr. 15, 2016, 1 page.
Oracle Video Server, Introducing Oracle Video Server, Release 3.0, Feb. 1998, 76 pages.
Oracle Video Server in the Broadcast Industry. An Oracle Technical While Paper, Apr. 1999, 15 pages.
Ortiz U.S. Pat. No. 7,149,549 raises SNQ as to Requester U.S. Pat. No. in U.S. Appl. No. 90/012,391, Decision Granting Ex Parte Reexamination dated Aug. 27, 2012.
Ortiz U.S. Pat. No. 7,149,549 and U.S. Pat. No. 7,796,162 raise SNQ as to Requester U.S. Pat. No. 7,486,943 in U.S. Appl. No. 90/009,979, Decision Granting Ex Parte Reexamination Feb. 10, 2012, Certificate Issued Oct. 22, 2012.
PacketVideo Corporation, Private Company Information—Businessweek, printed Apr. 15, 2016, 2 pages.
Parnes, P., The mStar Environment—Scalable Distributed Teamwork using IP Multicast, Sep. 1997, Thesis for Division of Software Engineering, Depart. of Computer Science and Electrical Engineering, Lulea University of Technology, Sweden, 74 pages.
Parnes, P., The mStar Environment—Distributed Collaborative Teamwork in Action, Aug. 7, 1997.
Parnes, P., The History of the mStar Entertainment, Lulea University of Technology, Sweden, Oct. 11, 1996, 4 pages.
Parnes, P. et al., Real-Time Control and Management of Distributed Applications using IP-Multicast, Proceedings of the Sixth IFIP/IEEE International Symposium on Integrated Network Management (1999) Boston, MA, May 24-28, 1999, pp. 901-914.
Parnes, P., An IP-Multicast based Framework for Designing Synchronous Distributed Multi-User Applications on the Internet, Doctoral Thesis, Computer Science and Electrical Engineering, Lulea University of Technology. Nov. 1999, 218 pages.
Parnes. P. et al., Paper D—mSTAR: Enabling Collaborative Applications on the Internet, Journal of Internet Computing Sep./Oct. 2000, pp. 95-108.
Pattath, A. et al., Interactive Visualization and Analysis of Network and Sensor Data on Mobile Devices, IEEE Symposium on Visual Analytics Science and Technology (2006) Baltimore, MD, Oct. 31-Nov. 2, pp. 83-90.
"Peanuts, popcorn and a PC at the old ballpark," www.king5.com, Sep. 28, 2000, pp. 1-4.
Petkovic. M. et al., A Framework for Video Modeiling, The Proc. of International Conference on Applied Informatics (2000) 6 pages.
Pham, T.-L. et al., A Situated Computing Framework for Mobile and Ubiquitous Multimedia Access using Small Screen and Composite Devices, Proceedings of the eighth ACM International Conference on Multimedia (2000) New York, pp. 323-331.
Phoenix: Baseball & Wireless—Arizona Diamondbacks' WiFi Web Portal, RCR Wireless News, http://www.youtube.com/watch?v=TRMWarCA0c, May 11, 2011.
Postel, J. RFC 768, User Datagram Protocol, Aug. 28, 1980, 3 pages.
Postel, J. (eds.), RFC: 791, Internet Protocol, DARPA Internet Program, Protocol Specification, Sep. 1981, 45 pages.
Postel, J. (eds.), RFC: 793, Transmission Control Protocol, DARPA Internet Program, Protocol Specification, Sep. 1981, 81 pages.
PR Newswire, iMove™ and InMotion Technologies Partner to Delivery Enhanced Sports Video Solutions Jun. 26, 2000, 4 pages.
Qian, L. of al., A General Joint Source-Channel Matching Method for Wireless Video Transmission, Data Compression Conference (1999) Snowbird, UT, Mar. 29-31, pp. 414-423.

Rehm, E., Representing Internet Streaming Media Meladata using MPEG-7 Multimedia Description Schemes, Proceedings of the 2000 ACM workshops on Multimedia (2000) New York, pp. 93-98.
Requester's Memorandum in Support of Their Motion to Consolidate and/or Dtay, Case 1: 12-cv-01309-WJ-ACT Document 58 p. 13 of 19 Filed Jan. 17, 2013.
Response in Opposition to Petition for Writ of Mandamus, Case: 13-144 Document: 11-1 p. 22 Filed: Jan. 23, 2013.
Results of Search in AppFT Database for U.S. Patents Referencing Bassett: "REF/7010492: 15 patents," Search performed May 25, 2011.
ReExam Control No. 90/012,489, Order Granting ReExamination of U.S. Pat. No. 8,045,965, dated Nov. 23, 2012.
Richer et al., ATSC Digital Television System, Proceedings of the IEEE, vol. 94, No. 1, Jan. 2006, United States.
Rigney, et al. "Remote Authentication Dial in User Service (RADIUS)" Network Working Group, Apr. 1997, 66 pages.
Rogier's Police Page, Sting, Brand New Day Tour (1999), http://www.dordt.nl/~gugten/tour-s06.htm; © Rogier van der Gugten, Utrecht, 2002.
Roman, M. et al., Integrating PDAs into Distributed Systems: 2K and PalmORB, Lecture Notes in Computer Science Sep. 13, 1999 pages.
Rowe, L. A. et al., BIBS: A Lecture Weboasting System, Mar. 20, 2001, 23 pages.
Ruel, VYVX, Doctor Design, and Erbes Dev. Group Go to the Ball Game: Watch PC-TV, Internet TV at the Stadium http://ruel.net/top/box.article.05.htm (Sep. 1, 1997).
Rysavy Research, "Strategic Use of Wi-Fi in Mobile Bioadhand Networks," Oct. 14, 2010 (13 pages).
Rysavy, The Spectrum Imperative: Mobile Broadband Spectrum and its Impacts for U.S. Consumers and the Economy an Engineering Analysis, Rysavy Research, May 16, 2011, United States.
Rysavy, Mobile Broadband Capacity Constraints and the Need for Optimization, Rysavy Research, Feb. 16, 2010, United States.
Rysavy, Transition to 4G, Rysavy Research, Sep. 1, 2010, United States.
Rysavy, Net Neutrality Regulatory Proposals: Operational and Engineering Implications for Wireless Networks and the Consumers They Serve, Rysavy Research, Jan. 14, 2010, United States.
Sachdev, "Rooftop owners seek to extend deal with Cubs by 9 years," Chicago Tribune, Jan. 30, 2013, http://articles.chicagotribune.com/2013-01-30/business/chi-wrigley-field-rooftop-owners-20130130_1_rooftop-owners-rooftop-businesses-cubs-place-signs.
Sahasrabuddhe, L. H. et al., Light-Trees: Optical Multicasting for Improved Performance in Wavelength-Routed Networks, IEEE Communications Feb. 1999, pp. 67-73.
Salzberg, K. et al., "Intel's Immersive Sports Vision," Intel Corporation, Mar. 30, 2001.
Sampath, L., Wireless/Mobile Video Delivery Architecture, Thesis, Graduate School of the University of Florida, 2000, 88 pages.
Sanborn, S., "Armchair Quarterbacks go Wireless at 3Com Park," *InfoWorld*, Sep. 29, 2009, pp. 1-2.
Santini, S. et al., A Multiple Perspective Interactive Video Architecture for VSAM, Proceedings of the 1998 DARPA Image Understanding Workshop, Monterey, CA, Nov. 1998, 5 pages.
ScanZ Communications Selects Cadence to Bring New Sports-Officiating Technology to Live, Speed Communications, May 5, 1999, 2 pages.
"Scanz Communications Forms Joint Venture with Screenco Ply Ltd," Business Wire, Oct. 25, 2000 (1 page).
"Scanz Communications and Star Bridge Systems Announce Strategic Alliance," Business Wire, Oct. 21, 1999 (2 pages).
Schatz, Wall Street Journal, Cell Phone Data-Roaming Rules Get FCC Green Light, Apr. 8, 2011.
Schmandt, C. et al., Impromptu: Managing Networked Audio Applications for Mobile Users, MoviSYS (2004) Boston, MA, Jun. 6-9, 11 pages.
Schmidt, B. K., An Architecture for Distributed, Interactive, Multi-Stream, Multi-Participant Audio and Video, Technical Report No. CSL-TR-99-781, Apr. 1999, Stanford University, 46 pages.

(56) References Cited

OTHER PUBLICATIONS

Schmuckler, E., "Best Seat in the House?" *Brandweek* Oct. 16, 2000 41(40):48, 5 pages.
Screenshot of www.scanz.com as of Jun. 2, 2000(2 pages).
Screenshot of www.scanz.com/Consumer_Product.htm as of Jun. 2, 2000 (2 pages).
Second Declaration of Paul S. Min, PhD, filed in Requester's Comments in Reexam Control No. 95/001,566, 25 pages.
"Seeing is Believing—Motorola and Packetvideo Demonstrate MPEG-4 Video over GPRS," Press Release, Packetvideo, May 10, 2000, pp. 1-3.
Servetto, S. D. et al., Video Multicast Over Fair Queueing Networks, Proceedings of the 2000 IEEE International Conference on Image Processing, Vancouver, BC Sep. 10-13, pp. 540-543 vol. 3.
"SGI at the Pepsi Center"; Silicon Graphics, Inc.; Jul. 2000, pp. 1-2.
Singh, A., Networking Protocols for Wireless Multimedia Streaming, Research Protect in the Dept. of Electrical Engineering and Computer Sciences; University of California, Berkeley, May 19, 2000, 27 pages.
SlapChop, http://slapchopp.wordpress.com/2009/12/30/gizmodos-look-back-at-mp3-players-of-2000-interesting-read/.
Smartphone, Wikipedia http://en.wikipedia.org/wiki/Smartphone (accessed Feb. 6, 2013).
Strupczewski, J. "Wireless gadgets give sports fans closer look," Dec. 14, 2001 Reuters News 12:50:05, Exhibit 5 of Case No. 1:10-cv-00433-JB-KBM, 4 pages.
Talluri, R. et al., A Robust, Scalable, Object-based Video Compression Technique for Very Low Bitrate Coding, IEEE Transactions on Circuits and Systems for Video Technology (1997) 7(1):221-233.
Tamm, G., "100,000 following sailing on the net," Contact (2000) No. 3, Mar. 2, Ericsson, Exhibit 3 of Case No. 1:10-cv-00433-JB-KBM, 3 pages.
Tamm, G., "Mobile Internet takes you to the ice," Contact (2000) No. 8, May 18, Ericsson, Exhibit 1 of Case No. 1: 10-cv-00433-JB-KBM, 3 pages.
Taylor, H. et al., "The Magic Video-on-Demand Server and Real-Time Simulation System," IEEE Parallel & Distributed Technology (1995) Summer, pp. 40-51.
Technical Specifications, IBM WorkPad 10u, retrieved from http://pdadb.net/index.php?m=specs&id=1135&view=1&c=ibm_workpad on Aug. 10, 2011 (2 pages).
Technical Specifications, IBM WorkPad 20X, retrieved from http://pdadb.net/index.php?m=specs&id=1136&view=1&c=ibm on Aug. 10, 2011 (3 pages).
Technical Specifications, IBM WorkPad 22X, retrieved from http://pdadb.net/index.php?m=specs&id=1139&view=1&c=ibm on Aug. 10, 2011 (2 pages).
Technical Specifications, IBM WorkPad 30x, retrieved from http://pdadb.net/index.php?m=specs&id=1144&view=1&c=ibm on Aug. 10, 2011 (2 pages).
Technical Specifications, IBM WorkPad 40u, retrieved from http://pdadb.net/index.php?m=specs&id=1145&view=1&c=ibm on Aug. 10, 2011 (2 pages).
Technical Specifications, IBM WorkPad c3, retrieved from http://pdadb.net/index.php?m=specs&id=1152&view=1&c=ibm on Aug. 10, 2011 (2 pages).
Technical Specifications, IBM WorkPad c500, retrieved from http://pdadb.net/index.php?m=specs&id=1164&view=1&c=ibm on Aug. 10, 2011 (2 pages).
Technical Specifications, IBM Workplace z505, retrieved from http://pdadb.net/index.php?m=specs&id=1165&view=1&c=ibm on Aug. 10, 2011 (2 pages).
Technical Specifications, IBM WorkPad c50, retrieved from http://pdadb.net/index.php?m=specs&id=1165&view=1&c=ibm on Aug. 10, 2011 (2 pages).
Tiilkainen, P., SIP (RFC 2543), an Implementation for Marratech Pro, Thesis, Division of Software Engineering, Depart. of Computer Science and Electrical Engineering, Lulea University of Technology, Sweden, Apr. 2000, 29 pages.
Tiley, HPC Factor, IBM Workpad z50, http://www.hocfactor.com/reviews/hardware/ibm/workpad-z50/ (2005).
Traffic411.com Joins Packet Video in Wireless Multimedia Trials http://www.traffic411.com/pressbody.html#06-13-00 (Jun. 13, 2000).
Trask, N. T. et al., "Smart Cards in Electronic Commerce," *BT Technol J.*, (1999) 17(3):57-66, July.
Umstead, Thomas, NBA's Digital Drive, Multichannel News, Jan. 21, 2008.
Unstrung: The Birth of the Wireless Internet, CIBC World Markets, Equity Research, Oct. 4, 2000, pp. 1-140.
Vass, J. et al., Mobile Video Communications in Wireless Environments, IEEE 3rd Workshop on Multimedia Signal Processing (1999) Copenhagen, Sep. 13-15, pp. 45-50.
Vernick, M., The Design, Implementation, and Analysis of the Stony Brook Video Server, Dissertation, Doctor of Philosophy, Computer Science, State University of New York, Stony Brook, Dec. 1996, 137 pages.
Video Nuze, MLB: Mobile Use of Our Content Will Exceed Online Within 12-18 Months (Jun. 21, 2011).
"Viewers Take Control," Entrepreneur, Video Age International, Apr. 2000, 1 page.
Virage, Inc., C-Span and Virage Launch Wireless Presidential Debate Video Search Engine, Oct. 3, 2000, 4 pages.
Wallen, J., GEO targets Big Brother addicts, Citywire Money Nov. 1, 2000, 1 page.
Walters, J., "Instant Gratification," Sports Illustrated Asia (1999) http://sportsillustrated.asia/vault/article/magazine/MAG1017633/index/htm, Nov. 15.
Wang, H. J., "Policy-Enabled Handoffs Across Heterogeneous Wireless Networks," Second IEEE Workshop on Mobile Computing Systems and Applications Proceedings (1999) 30 pages.
Wang, Y. et al., Error Control and Concealment for Video Communication: A Review, Proceedings of the IEEE (1998) 86(5):974-997.
Widerey, Jack SP640 User Guide, 2002, 23 pages.
Wikstrand, G. et al., Designing a Football Experience for a Mobile Device, Human-Computer Interation (2003) Rauterberg, M. et al., (eds.) IOS Press, pp. 940-943.
Wikstrand, G., Human Factors and Wireless Network Applications, More Bits and Better Bits, Ph.D. Thesis, Depart. of Computing Science, Umea University, 2006, 91 pages.
Williams, P., "No choice: Stats, highlights available in wireless world," *Street & Smith's Sports Business Journal* Apr. 8, 2002 (2 pages).
"Wireless Dimensions Corporation Adds to Mobile-Venue Suite™"; Press Release, Wireless Dimensions; Allen, Texas; Jul. 26, 2000; http://www.wirelessdimensions.net/news.html, pp. 1-2.
"Wireless Dimensions Corporation Unveils Mobile-Venue Suite™"; Press Release, Wireless Dimensions; Allen, Texas; Jun. 19, 2000; http://www.wirelessdimensions.net/news.html, pp. 2-3.
Wolfe, A. et al., "Handhelds, downsized PCs, smart phones converge on Comdex—Info appliances go prime time," *Electronic Engineering Times* Nov. 15, 1999 (3 pages).
Worden, Wall Street Journal, ESPN Launches App for Mobile-TV Devices, http://online.wsj.com/article/SB10001424052748704031604576248892096438426.htm, Apr. 8, 2011.
Worldzap AG: Private Company Information—Businessweek, printed Apr. 20, 2016, 1 page.
Wray, The Guardian, co.uk, Handset hitch forces 3G Delay, http://www.guardian.co.uk/technology/2001/dec/05/internetnews.mobilephones/print, Dec. 5, 2001, UK.
Wu, D., An Internet MBone Broadcast Management System, Jul. 15, 1998, 11 pages.
Wu, et al., "On End-to-End Architecture for Transporting MPEG-4 Video over the Internet," *IEEE Transactions on Circuits and Systems for Video Technology* (2000) 10(6):1-18, Sept.
Xu, D. et al., Providing Seamless QoS for Multimedia Multicast in Wireless Packet Networks, SPIE 3528, Multimedia Systems and Applications Jan. 22, 1999, 10 pages.

(56) References Cited

OTHER PUBLICATIONS

Yankee Stadium Policies and Procedures, New York Yankee's Website, see Cameras and Video Equipment Section (p. 2) (accessed Feb. 6, 2013) http://mlb.mlb.com/nyy/ballpark/information/index.jsp?content=policies.
Yun, L. C., Digital Video in a Fading Interference Wireless Environment, IEEE International Conference on Acoustics, Speech, and Signal Processing (1996) Atlanta, GA, May 7-10, pp. 1069-1072 vol. 2.
Zaslavsky, A. et al., Mobile Computing: Overview and Current Status, Australian Computer Journal (1999) 30(2):42-52.
Zhong et al., The Development and eStadium Testbeds for Research and Development of Wireless Services for Large-scale Sports Venues. $2^{nd}$ Int'l IEEE/Create-Net TridentCom, Conference on Testbeds and Research Infrastructures for the Development of Networks and Communities in Barcelona, Spain, 2006.
U.S. Appl. No. 14/186,48—Office Action dated Jul. 15, 2016.
95/001,565 3PR Request for Re-exam submitted Mar. 4, 2011.
95/001,565 PO Response to non-final Office Action submitted May 26, 2011.
95/001,565 Decision on Petition Dismissed issued Aug. 18, 2011.
95/001,565 Decision on Petition Granted in part issued Nov. 4, 2011.
95/001,565 PO Response after non-final action submitted Nov. 21, 2011.
95/001,565 Information Disclosure Statement submitted Dec. 14, 2011.
95/001,565 Decision on Petition Dismissed issued Jan. 1, 2012.
95/001,565 Decision on Petition Dismissed issued Feb. 3, 2012.
95/001,565 PO Response after non-final action submitted Feb. 16, 2012.
95/001,565 Decision on Petition Dismissed issued Mar. 2, 2012.
95/001,565 Decision on Petition Dismissed issued Mar. 7, 2012.
95/001,565 Action Closing Prosecution issued Mar. 12, 2012.
95/001,565 PO Comments after Action Closing Prosecution submitted Mar. 16, 2012.
95/001,565 Affidavit(s), Declaration(s) and/or Exhibit(s) submitted Mar. 16, 2012.
95/001,565 Decision on Petition Dismissed issued Jun. 5, 2012.
95/001,565 Affidavit(s), Declaration(s) and/or Exhibit(s) submitted Jun. 6, 2012.
95/001,565 Decision on Petition Dismissed issued Oct. 25, 2012.
95/001,565 Reexam—non-final action + determine — on issued Apr. 11, 2011.
95/001,565 Accepted response only submitted Nov. 9, 2012.
95/001,565 PO complete Response to non-final Office Action + RTB declaration + petitions submitted Nov. 9, 2012.
95/001,565 3PR Opposition tiled in response to petition submitted Nov. 23, 2012.
95/001,565 Decision on Petition (PO petition to revive) issued Apr. 2, 2013.
95/001,565 Decision on Petition (PO page waiver) issued Jul. 2, 2013.
95/001,565 3PR Petition, IDS, Comments after ACP submitted Aug. 1, 2013.
95/001,565 Decision on Petition (3PR page waiver) issued Nov. 18, 2013.
95/001,565 Information Disclosure Statement filed Nov. 22, 2013.
95/001,565 Information Disclosure Statement filed Nov. 27, 2013.
95/001,565 Action Closing Prosecution issued Apr. 11, 2014.
95/001,565 3PR Petition to Require Examiner to consider Gullichsen Articles submitted Jun. 10, 2014.
95/001,565 Decision on Petition Denied issued Aug. 8, 2014.
95/001,565 3PR Renewed Petition to Require Examiner to consider Gullichsen Articles submitted Oct. 8, 2014.
95/001,565 Decision on Petition Granted issued Dec. 8, 2014.
95/001,565 Non-Final Office Acton issued Jan. 29, 2015.
95/001,565 PO Response to Non-Final Office Action submitted Mar. 30, 2015.
95/001,565 3PR Request Comments after Non-Final Action submitted Apr. 29, 2015.
95/001,565 Decision on Petition Granted issued Jun. 22, 2015.
95/001,565 Affidavit(s), Declaration(s) and/or Exhibit(s) submitted Aug. 19, 2015.
95/001,565 Information Disclosure Statement filed Aug. 19, 2015.
95/001,565 Decision on Petition Granted issued Sep. 11, 2015.
95/001,565 3PR Comments after Non-Final Office Action submitted Oct. 8, 2015.
95/001,565 Action Closing Prosecution issued Jan. 20, 2016.
95/001,565 PO Response to Action Closing Prosecution submitted Feb. 22, 2016.
95/001,565 3PR Requester Comments after Action Closing Prosecution submitted Mar. 23, 2016.
95/001,565 Right of Appeal Notice issued Apr. 11, 2016.
95/001,565 Notice of Appeal filed May 10, 2016.
95/001,566 Receipt of Original Inter Partes Reexam Request Mar. 4, 2011.
95/001,566 Reexamination Formalities Notice Mailed Mar. 15, 2011.
95/001,566 Notice of reexamination request filing date Mar. 15, 2011.
95/001,566 Non-Final Office Action Apr. 22, 2011.
95/001,566 Response after non-final action—owner—timely Jun. 17, 2011.
95/001,566 Information Disclosure Statement (IDS) filed Jun. 17, 2011.
95/001,566 Receipt of Petition in a Reexam Jul. 18, 2011.
95/001,566 Third Party Requester Comments after Non-final Action Jul. 18, 2011.
95/001,566 Information Disclosure Statement (IDS) File Jul. 18, 2011.
95/001,566 Information Disclosure Statement filed Jul. 18, 2011.
95/001,566 Notification of Defective Paper in a Reexam Jul. 27, 2011.
95/001,566 RX—Mail Petition Decision—Dismissed Aug. 18, 2011.
95/001,566 Receipt of Petition in a Reexam Aug. 26, 2011.
95/001,566 Receipt of Petition in a Reexam Nov. 21, 2011.
95/001,566 Receipt of Petition in a Reexam Dec. 14, 2011.
95/001,566 Third Party Request Comments after Non-final Action Dec. 14, 2011.
95/001,566 RX—Mail Petition Decision—Dismissed Jan. 26, 2012.
95/001,566 Petition Decision on Request for Reconsideration Denying Reexamination Feb. 3, 2012.
95/001,566 Receipt of Petition in a Reexam Feb. 16, 2012.
95/001,566 Response after non-final action—owner—timely Feb. 16, 2012.
95/001,566 RX—Mail Petition Decision—Dismissed Mar. 2, 2012.
95/001,566 RX—Mail Petition Decision—Dismissed Apr. 24, 2012.
95/001,566 Receipt of Petition in a Reexam May 3, 2012.
95/001,566 Response after non-final action—owner—timely May 3, 2012.
95/001,566 Receipt of Petition in a Reexam Aug. 20, 2012.
95/001,566 Third Party Request Comments after Non-final Action Aug. 20, 2012.
95/001,566 RX—Mail Petition Decision—Granted Oct. 24, 2012.
95/001,566 RX—Mail Inter Partes Non-Final Office Action Mar. 28, 2013.
95/001,566 Response after non-final action—owner—timely May 24, 2013.
95/001,566 Affidavit(s), Declaration(s) and/or Exhibit(s) Filed May 24, 2013.
95/001,566 Information Disclosure Statement Filed Jun. 24, 2013.
95/001,566 Reexam—Affidavit(s), Declaration(s) and/or Exhibit(s) Filed by Third Party Requester Jun. 24, 2013.
95/001,566 Receipt of Petition in a Reexam Jun. 24, 2013.
95/001,566 Third Party Requester Comments after Non-Final Action Jun. 24, 2013.
95/001,566 Ready for Examiner Action after Nonfinal Jun. 24, 2013.
95/001,566 RX—Mail Notice of Defective Paper Sep. 18, 2013.

(56) References Cited

OTHER PUBLICATIONS

95/001,566 RX—Mail Petition Decision—Dismissed Sep. 23, 2013.
95/001,566 Third Party Request Comments after Non-final Action Oct. 3, 2013.
95/001,566 Information Disclosure Statement filed Oct. 3, 2013.
95/001,566 Information Disclosure Statement filed Nov. 22, 2013.
95/001,566 Information Disclosure Statement (IDS) Filed Nov. 27, 2013.
95/001,566 RX—Mail Petition Decision—Granted Feb. 20, 2014.
95/001,566 Information Disclosure Statement considered May 19, 2014.
95/001,566 RX—Mail Reexam—Action Closing Prosecution Jun. 9, 2014.
95/001,566 Patent Owner—Comments after Action Closing Prosecution Jul. 8, 2014.
95/001,566 Third Party Requester Comments after Action Closing Proesecution Aug. 7, 2014.
95/001,566 Ready for Examiner Action after ACP Aug. 7, 2014.
95/001,566 Receipt of Petition in a Reexam Aug. 7, 2014.
95/001,566 RX—Mail Petition Decision—Granted Sep. 22, 2014.
95/001,566 RX—Mail Notification of Informal or Nonresponsive Amendment Dec. 10, 2014.
95/001,566 Patent Owner Comments after Action Closing Prosecution Jan. 12, 2015.
95/001,566 RX—Mail Inter Partes Non-Final Office Action Mar. 31, 2015.
95/001,566 Response after non-final action—owner—timely Jun. 1, 2015.
95/001,566 Informal response/amendment Jul. 22, 2015.
95/001,566 RX—Mail Petition Decision-Dismissed Jul. 24, 2015.
95/001,566 Response after non-final action—owner—timely Aug. 21, 2015.
95/001,566 Receipt of Petition in a Reexam Sep. 21, 2015.
95/001,566 Third Party Requester Commentts after Non-Final Action Sep. 21, 2015.
95/001,566 RX—Mail Petition Decision—Granted Oct. 1, 2015.
95/001,566 RX—Mail Reexam—Action Closing Prosecution Jan. 20, 2016.
95/001,566 Certificate of Serice Feb. 22, 2016.
95/001,566 Patent Owner Comments after Action Closing Prosecution Feb. 22, 2016.
95/001,566Third Party Request Comments after Action Closing Prosecution Mar. 23, 2016.
95/001,566 Right of Appeal Notice May 19, 2016.
95/001,566 Notice of Appeal Filed Jun. 17, 2016.
95/001,566 Certificate of Service Jun. 21, 2016.
95/001,567 Receipt of Original Inter Partes Reexam Request Mar. 7, 2011.
95/001,567 Reexam—Information Disclosure Statement filed by Third Party Request Mar. 7, 2011.
95/001,567 Reexam Litigation Search Conducted Mar. 13, 2011.
95/001,567 Reexamination Formalities Notice Mailed Mar. 23, 2011.
95/001,567 Notice of reexamination request filing date Mar. 23, 2011.
95/001,567 Notice of assignment of reexamination request Mar. 23, 2011.
95/001,567 Reexam—Non-Final Action Apr. 22, 2011.
95/001,567 Action Closing Prosecution (non-final) Aug. 22, 2011.
95/001,567 Right of Appeal Notice Oct. 26, 2011.
95/001,567 Notice of Appeal—Requester Nov. 23, 2011.
95/001,567 Receipt of Petition in a Reexam Feb. 21, 2012.
95/001,567 Notice of Non-Compliant Owner Respndents Brief Feb. 23, 2012.
95/001,567 Notice of Non-Compliance Mailed—Owner Respondents Brief Feb. 23, 2012.
95/001,567 Respondent Brief—Owner Mar. 5, 2012.
95/001,567 Receipt of Petition in a Reexam Mar. 6, 2012.
95/001,567 RX—Mail Petition Decision—Granted Mar. 16, 2012.
95/001,567 Receipt of Petition in a Reexam Mar. 30, 2012.
95/001,567 Appeal Brief—Third Party Requester Apr. 16, 2012.
95/001,567 Respondent Brief—Owner May 16, 2012.
95/001,567 RX—Mail Petition Decision—Denied Jun. 20, 2012.
95/001,567 Receipt of Petition in a Reexam Jun. 25, 2012.
95/001,567 RX—Mail Petition Decision—Dismissed Jul. 26, 2012.
95/001,567 RX—Mail Petition Decision—Granted Aug. 2, 2012.
95/001,567 Receipt of Petition in a Reexam Sep. 10, 2012.
95/001,567 RX—Mail Petition Decision—Granted Oct. 10, 2012.
95/001,567 Receipt of Petition in a Reexam Oct. 24, 2012.
95/001,567 Respondent Brief—Owner Reviews by BPAI Complete Oct. 24, 2012.
95/001,567 RX—Mail Petition Decision—Granted Dec. 19, 2012.
95/001,567 RX—Mail Examiners Answer Mar. 7, 2013.
95/001,567 Oral Hearing Reguest—Third Party Requester Apr. 8, 2013.
95/001,567 Rebuttal Brief—Request Review by BPAI Complete Apr. 8, 2013.
95/001,567 RX—Mail Miscellaneous Communication to Applicant Apr. 29, 2013.
95/001,567 Docketing Notice Mailed to Appellant Jun. 20, 2013.
95/001,567 Notification of Appeal Hearing Nov. 7, 2013.
95/001,567 Oral Hearing Request—Nov. 12, 2013.
95/001,567 Confirmation of Hearing by Applicant Nov. 14, 2013.
95/001,567 Confirmation Hearing by Applicant Nov. 18, 2013.
95/001,567 Information Disclosure Statement Filed Nov. 23, 2013.
95/001,567 Information Disclosure Statement (IDS) Filed Nov. 27, 2013.
95/001,567 Board of Patent Appeals and Interferences Decision—Reversed Jan. 8, 2014.
95/001,567 BPAI Decision: New Grown of Rejection (R. 1.977(b)) Jan. 8, 2014.
95/001,567 Patent Owner Response after Board Decision with New Ground of Rejection R. 1.977(b) Feb. 7, 2014.
95/001,567 Request Comments on Patent Owner Response after Board Decision Mar. 7, 2014.
95/001,567 Information Disclosure Statement Filed Mar. 7, 2014.
95/001,567 Mail—Order by BPAI Apr. 8, 2014.
95/001,567 Receipt of Petition in a Reexam May 2, 2014.
95/001,567 Reexam—Opposition filed in response to petition May 16, 2014.
95/001,567 RX—Mail Petition Decision—Denied Jul. 25, 2014.
95/001,567 Receipt of Petition in a Reexam Aug. 1, 2014.
95/001,567 Patent Owner Response after Board Decision with New Ground of Rejection R. 1.977(b) Aug. 1, 2014.
95/001,567 RX—Mail Petition Decision—Granted Sep. 3, 2014.
95/001,567 Request Comments on Patent Owner Response after Board Decision Sep. 17, 2014.
95/001,567 Information Disclosure Statement (IDS) Filed Sep. 17, 2014.
95/001,567 Receipt of Petition in a Reexam Sep. 17, 2014.
95/001,567 RX—Mail Petition Decision—Dismissed Oct. 2, 2014.
95/001,567 BPAI Decision: Remand to Examiner (R. 077(d) Nov. 12, 2014.
95/001,567 RX—Mail Petition Decision—Dismissed Nov. 19, 2014.
95/001,567 RX—Mail Miscellaneous Communications to Applicant Dec. 19, 2014.
95/001,567 RX—Mail Determination on Resp/Comments Aft BPAI Dec. w/New Ground of Ref. Jan. 16, 2015.
95/001,567 Owner Comments on Exmnr's Determination Aft BPAI Dec. w/New Groud of Rej. Feb. 17, 2015.
95/001,567 Request Comments on Exmnr's Determination Aft BPAI Dec w/New Ground of Rej. Mar. 13, 2015.
95/001,567 Docketing Notice Mailed to Appellant Aug. 21, 2015.
95/001,567 BPAI Decision—Examiner Affirmed Sep. 16, 2015.
95/001,567 Mail BPAI Decision on Appeal—Affirmed Sep. 16, 2015.
95/001,567 RX—Mail Notice of Intent to Issue Reexam Certificate Jan. 20, 2016.
95/001,567 Reexamination Certificate issued Feb. 23, 2016.
95/001,568 3PR Request for Reexam submitted Mar. 7, 2011.

(56) References Cited

OTHER PUBLICATIONS

95/001,568 Notice of Assignment of Reexamination Request Mar. 17, 2011.
95/001,568 Notice of Reexamination request filing date Mar. 17, 2011.
95/001,568 Reexam—non-final action + determination issued May 19, 2011.
95/001,568 Information Disclosure Statement filed Jul. 14, 2011.
95/001,568 PO Response after non-final action Jul. 14, 2011.
95/001,568 3PR Information Disclosure Statement filed Aug. 12, 2011.
95/001,568 Notification of Defective Paper in a Reexam Oct. 13, 2011.
95/001,568 Decision on Petition Dismissed Oct. 27, 2011.
95/001,568 Decision on Petition Dismissed Nov. 4, 2011.
95/001,568 Notification of Defective Paper in a Reexam Nov. 4, 2011.
95/001,568 PO Response after non-final action Nov. 21, 2011.
95/001,568 Information Disclosure Statement filed Dec. 14, 2011.
95/001,568 Decision on Petition Dismissed Jan. 26, 2012.
95/001,568 Decision on Petition Denied Feb. 2, 2012.
95/001,568 Receipt of Petition in a Reexam Feb. 16, 2012.
95/001,568 Decision on Petition Dismissed Mar. 2, 2012.
95/001,568 Decision on Petition Dismissed Mar. 7, 2012.
95/001,568 Notice of Intent to Issue a Reexam Certificate Mar. 12, 2012.
95/001,568 Affidaviff(s), Declaration(s) and/or Exhibit(s) Mar. 16, 2012.
95/001,568 Decision on Petition dismissed Jun. 5, 2012.
95/001,568 PO Response after non-final action Jun. 6, 2012.
95/001,568 Decision on Petition Dismissed Nov. 26, 2012.
95/001,568 PO Complete Response to Non-Final Office Action + RTB declaration + petitions, submitted Dec. 14, 2012.
95/001,568 Accepted response only submitted Dec. 14, 2012.
95/001,568 Reexam—Opposition filed in response to petition Dec. 28, 2012.
95/001,568 Information Disclosure Statement filed Nov. 22, 2013.
95/001,568 Information Disclosure Statement filed Nov. 27, 2013.
95/001,568 Decision on Petition(PO petition to revive) issued Dec. 13, 2013.
95/001,568 Decision on Petition (PO page waiver) issued Dec. 13, 2013.
95/001,568 3PR Petition, IDS, Comments after non-final Office Action submitted Jan. 13, 2014.
95/001,568 Decision on Petition (3PR page waiver) issued Mar. 20, 2014.
95/001,568 Non-Final Office Action issued May 29, 2014.
95/001,568 Response to Non-Final Office Action submitted Jul. 29, 2014.
95/001,568 3PR Comments on PO Response submitted Aug. 28, 2014.
95/001,568 Notification of Nonresponseive Amendment Sep. 23, 2014.
95/001,568 PO Response after non-final action Oct. 3, 2014.
95/001,568 Decision on Petition (3PR page Waiver) issued Dec. 1, 2014.
95/001,568 3PR's Abridge Comments submitted Dec. 30, 2014.
95/001,568 Action Closing Prosecution issued Feb. 26, 2015.
95/001,568 PO's Comments after ACP submitted Mar. 30, 2015.
95/001,568 3PR's Comments after ACP submitted Apr. 29, 2015.
95/001,568 Right of Appeal Notice issued May 27, 2015.
95/001,568 Notice of Appeal Patnet Owner submitted Jun. 29, 2015.
95/001,568 Petition for Continued Reexamination Patent Owner submitted Jul. 27, 2015.
95/001,568 Opposition to Petition to Reopen Prosecution 3PR submitted Aug. 10, 2015.
95/001,568 Reexam Miscellaneous Incoming Letter Sep. 14, 2015.
95/001,568 Decision on Petition issued Feb. 2, 2016.
95/001,568 Notice of Intent to Issue Reexam Certificate Mar. 31, 2016.
95/001,568 Rexamination Certificate Issued Apr. 28, 2016.
95/002,393 Receipt of Original Inter Partes Reexam Request Sep. 15, 2012.
95/002,393 Reexamination requested by third party requester Sep. 15, 2012.
95/002,393 Notice of assignment of reexamination request.
95/002,393 Notice of reexamination request filing date Oct. 18, 2012.
95/002,393 Reexamination Formalities Notice Mailed Oct. 19, 2012.
95/002,393 RX—Mail Inter Partes Reexam Order—Granted Dec. 7, 2012.
95/002,393 RX—Mail Inter Partes Non-Final Office Action Dec. 7, 2012.
95/002,393 Information Disclosure Statement (IDS) Filed Feb. 7, 2013.
95/002,393 Response after non-final action—owner—timely Feb. 7, 2013.
95/002,393 Receipt of Petition in a Reexem Feb. 7, 2013.
95/002,393 RX—Concurrent Proceedings Notice Feb. 7, 2013.
95/002,393 Information Disclosure Statement filed Feb. 7, 2013.
95/002,393 Receipt of Petition in a Reexem Mar. 11, 2013.
95/002,393 Third Party Request Comments after Non-Final Action Mar. 11, 2013.
95/002,393 Affidavit(s), Declaration(s) and/or Exhibit(s) filed Mar. 11, 2013.
95/002,393 Information Disclosure Statement filed Mar. 11, 2013.
95/002,393 RX—Mail Petition Decism—Granted Jul. 15, 2013.
95/002,393 RX—Mail Notice of Defective Paper Jul. 24, 2013.
95/002,393 RX—Mail Reexam—Action Closing Prosecution Aug. 29, 2013.
95/002,393 Receipt of Petition in a Reexam Sep. 12, 2013.
95/002,393 Information Disclosure Statement filed Sep. 12, 2013.
95/002,393 Information Disclosure Statement filed Sep. 27, 2013.
95/002,393 RX—Concurrent Proceedings Notice Sep. 27, 2013.
95/002,393 Information Disclosure Statement (IDS) Filed Sep. 27, 2013.
95/002,393 Receipt of Petition in a Reexam Sep. 27, 2013.
95/002,393 Receipt of Petition in a Reexam Oct. 28, 2013.
95/002,393 Information Disclosure Statement filed Nov. 22, 2013.
95/002,393 Information Disclosure Statement filed Nov. 27, 2013.
95/002,393 RX—Mail Petition Decision—Dismissed Dec. 18, 2013.
95/002,393 RX—Mail Petition Decision—Dismissed Mar. 19, 2014.
95/002,393 Receipt of Petition in a Reexam Apr. 16, 2014.
95/002,393 RX—Mail Petition Decision—Granted May 20, 2014.
95/002,393 RX—Mail Reexam—Action Closing Prosecution Jun. 4, 2015.
95/002,393 Patent Owner Comments after Action Closing Prosecution Jul. 6, 2015.
95/002,393 Patent Owner Comments after Action Closing Prosecution Jul. 7, 2015.
95/002,393 Information Disclosure Statement Filed Aug. 5, 2015.
95/002,393 Third Party Request Comments after Action Closing Prosecution Aug. 5, 2015.
95/002,393 Reexam—Affidavit's), Declaration(s) and/or Exhibit(s) Filed by Third Party Requester Aug. 5, 2015.
http://mlb.mlb.com/mlb/subscriptions/index.jsp?product=mlbtv (Accessed Apr. 2, 2011).
http://mlb.mlb.com/content/printer_friendly_mlb/y2011/m02/d10/c16607938.jsp (Accessed Apr. 2, 2011).
http://www.sportsbusinessdaily.com/Journal/issues/2009/07/20090713/This-Weeks-News/Streaming-Worth-$40M-to-Baseball.aspz?hl=mlb.tv%20subscribers&sc=0 (Accessed May 19, 2011).
http://www.sportsbusinessdaily.com/Journal/Issues/2007/02/20070219/SBJ-In-Depth/The-Rise-of-Online-Video.aspz?hl=mlb.tv%20subscriber&sc=0 (Accessed May 19, 2011), 2006.
http://web.archive.org/web/20070406201604/http://mlb.mlb.com/mlb/subscriptions.mbltv.jsp?c_id-mlb (Accessed Apr. 2, 2011), 2006-2007.

(56) References Cited

OTHER PUBLICATIONS http://www.sportsbusinessdaily.com/Journal/Issues/2008/03/20080324/This-Weekly-News/MLBAM-To-Roll-Out-Enhanced-Content.aspx (Accessed Apr. 2, 2011), 2007.
http://www.businessinsider.com/2009/2/spring-training-for-hi-def-mlbcom (Accessed Apr. 2, 2011), 2008.
http://web.archive.org/web/20080213232003/mlb.mlb.com/mlb/subscriptions/indez/jsp?c_id=mlb (Accessed Apr. 2, 2011), 2008.
http://www.sportsbusinessdaily.com/Journal/Issues/2009/11/20091109/This-Weeks-News/Yankees-Streaming-Sells-6000-Subs.aspx (Accessed Apr. 2, 2011), 2009.
http://newyork.yankees.mlb.com/news/article.jsp?ymd=20090203&contect_id=3793684&vkey-news_mlb&fext=.sp&c_id=mlb (Accessed Apr. 2, 2011), 2009.
http://www.sportsbusinessdaily.com/Journal/Issues/2011/03/21/Media/MLBAM.aspx (Accessed Apr. 2, 2011), 2010.
http://replay.waybackmachine.org/20100319010030/http://mlb.mlb.com/mlb/subscriptions/index.jsp?product=mlbtv&affiliateld=mlbMENUMLBTV (Accessed Apr. 2, 2011), 2010.
http://mlb.mlb.com/mobile/atbat/index.jsp?c_id=mlb (Accessed Apr. 2, 2011).
http://news.cnet.com/8301-13579_3-9960064-37.html (Accessed Apr. 2, 2011).
http://mlb.mlb.com/news/press_releases/press_release.jsp?ymd=20090610&contect_id=5249086&vkey=pr_mlbcom&fext=.jsp&c_id=mlb (Accessed Apr. 2, 2011).
http://mlb.mlb.com/news/article.jsp?c_id=mlb&content_id=7983018&fext=.jsp&ymd=20100127&vkey=news_mlb (Accessed Apr. 2, 2011).
http://mlb.mlb.com/news/press_releases/press_release.jsp?ymd=20100915&contect_id=14704522&vkey=pr_mlbcom&fext-.jsp&c_id=mlb (Accessed Apr. 2, 2011).
http://mlb.mlb.com/news/press_releases/press_release.jsp?ymd=20100915&contect_id=14704522&vkey=pr_mlbcom&fext-.jsp&c_id=mlb (Accessed Apr. 2, 2011).
http://itunes.apple.com/us/app/mlb-com/at-bat-11/id420031160?mt=8 (Accessed Apr. 2, 2011).
http://www.apple.com/pr/library/2011/01/22appstore.html (Accessed May 19, 2011).
http://www.mobilemarketingandtechnology.com/2010/toppost/most-developers-will-not-make-money-on-apps/(Accessed May 19, 2011).
http://www.signiant.com/signiant-news-and-press-releases/bid/28516/Sports-Streaming-s-Big-Play (Accessed Apr. 2, 2011), 2009.
http://www.nba.com/leaguepass/3pp/index.html (Accessed Apr. 2, 2011).
http://www.nba.com/leaguepass/broadband/index.html (Accessed Apr. 2, 2011).
http://www.nba.com/leaguepass/mobile/index.html (Accessed Apr. 2, 2011).
http://www.itv.com/story/6258/nba-digital-trumpets-its-cross-platform-success (Accessed Apr. 2, 2011).
http://www.beet.tv/2010/02/nba-digital-breaks-record-with-17-million-views-of-nba-allstar-game.html (Accessed Apr. 2, 2011).
http://news.turner.com/article—display.cfm?article—id=5089 (Accessed Apr. 2, 2011).
http://news.turner.com/article_display.cfm?article_id=5213 (Accessed Apr. 2, 2011).
http://gigaom.com/video/multiplatform-video-pays-off-for-the-nba (Accessed Apr. 2, 2011).
http://news.turner.com/article_display.cfm?article_id=5564 (Accessed Apr. 2, 2011).
http://www.nytimes.com/2011/05/03/business/media/03television.html?_r=1&pagewanted=print (Accessed May 19, 2011).
http://www.rcrwireless.com/article/20110513/DAS/110519968/arizona-diamondbacks-take-a-swing-at-wi-fi-portal-for-fans (Access May 10, 2011).
http://sportsvideo.org.main/blog/2011/05/13/nba-digital%e2%80%99s-perez-on-cord-cutting-adapt-or-%e2%80%98risk-losing-an-entire-generation-of-fans%e2%80%99/print/ (Accessed May 19, 2011).
http://videonuze.com/blogs/?2010-07-13/Sports-Continues-to-be-Shining-Star-of-Online-Video/&id=2633 (Accessed Apr. 2, 2011).
http://www.sportsbusinessdaily.com/Journal/Issues/2010/02/20100222/SBJ-In-Depth/Whats-The-Right-Call-On-Wireless.aspx (Accessed Apr. 2, 2011).
http://www.nba.com/leaguepass/broadband/index.html (Accessed Mar. 28, 2011).
http://mlb.mlb.com/news/article.jsp?ymd=20100930&contect_id=15258494&vkey=news_mlb&c_id=mlb (Accessed May 11, 2011).
http://mlb.mlb.com/news/article/jsp?ymd=20091006&content_id=7364784&vkey=news=mlb&fext=.jsp&c_id=mlb (Accessed May 11, 2011).
http://www.youtube.com/watch?v=g3_8Z6Aotp8 (Tony Verna Tribute), http://www.youtube.com/watch?v=TuFky-Zjr5s&feature-related (First Instant Replay).
3Com: Don't Get Up, Sports Fans, USA Today, Tech Report, Aug. 22, 2000, pp. 1-2.
10th Anniversary of Instant Replay, http://www.ihavenet.com/NFL/NFL-2009-10th-Anniversary-Instant-Replay.html, United States.
http://wiki.answer.com/O/How_many_plays_are_in_an_average_NFL_football_game, Answer.com, United States.
Aboba, "Introduction to Accounting Management".

ELECTRONIC WIRELESS HAND HELD MULTIMEDIA DEVICE

PRIORITY CLAIM AND CROSS-REFERENCE TO RELATED APPLICATIONS

This patent application is a continuation of U.S. patent application Ser. No. 12/257,205 entitled "Electronic Wireless Hand Held Multimedia Device," which was filed on Oct. 23, 2008, and which is incorporated herein by reference in its entirety.

U.S. patent application Ser. No. 12/257,205 is a continuation of U.S. patent application Ser. No. 09/887,492, entitled "Systems, Methods and Apparatuses for Brokering Data Between Wireless Devices and Data Rendering Devices," which was filed on Jun. 22, 2001, and claims priority to U.S. Provisional Patent Application, Ser. No. 60/214,339, entitled "Systems, Methods and Apparatuses for Brokering Data Between Wireless Devices and Data Rendering Devices," which was filed on Jun. 27, 2000.

U.S. patent application Ser. No. 12/257,205 is also a continuation of U.S. patent application Ser. No. 09/902,348, entitled "Providing Multiple Perspectives of a Venue Activity to Electronic Wireless Hand Held Devices," filed on Jul. 10, 2001, which claims the benefit of U.S. Provisional Application Ser. No. 60/243,561, which was filed on Oct. 26, 2000. All the aforementioned applications are incorporated herein by reference in their entirety. This patent application therefore traces its priority date back to Jun. 27, 2000 and Oct. 26, 2000 with the filing of the above-referenced U.S. provisional patent applications.

TECHNICAL FIELD

Embodiments are related to electronic wireless hand held devices, such as Personal Digital Assistants (PDAs), mobile phones and data-enabled wireless telephones. Embodiments are also related to an electronic wireless hand held multimedia device capable of processing multimedia data including video on a touch sensitive display screen associated with the hand held device. In addition, Embodiments relate to techniques for providing electronic wireless hand held multimedia devices capable of multimedia data transmission and retrieval from multiple networks and wireless connections including: cellular (including 3G), 802.11 standard networks such as a wireless local area network (WLAN), and short range and/or line of sight communications standards and networks such as that supported by Bluetooth, IrDA (infrared), and RFID. Embodiments also relate to electronic wireless hand held multimedia devices capable of determining location information and directions using GPS and by displaying maps retrieved from remote servers (e.g., via the Internet) on touch sensitive display screens associated with the electronic wireless hand held multimedia devices. Embodiments also relate to electronic wireless hand held multimedia devices capable of moving data to/from, and operating with, a removable cartridge (e.g., external memory, smart card, card-based application modules and electronics).

BACKGROUND OF THE INVENTION

Electronic wireless hand held devices, such as, for example PDAs, mobile phones, data/video-enabled cellular telephones, and other hand held wireless video-enabled devices have become a part of everyday life. For example, the shift in the consumer electronics industry from an emphasis on analog technology to a preference for digital technology is largely based on the fact that the former generally limits the user to a role of a passive recipient of information, while the latter is interactive and allows the user to control what, when, and how he or she receives and manipulates certain information. This shift in focus has resulted in the development and increasingly widespread use of a digital device generically referred to as a "personal digital assistant" (PDA).

PDAs are hand held computing devices (i.e., hereinafter referred to as "hand held devices" or "handheld devices") that are popular for processing, storing and maintaining information. The most advanced data-enabled wireless communication devices available in the marketplace on Jun. 27, 2000, the priority date of this patent application, took the form of a PDA. Examples of hand held devices that could be utilized in accordance with the methods and systems of the present invention include the "PalmPilot™" PDA, manufactured and sold by Palm Computing, the Handspring Visor™, Window CE™ compatible devices, RIM™ Blackberry-family devices, Motorola devices, and the Symbol™ SPT-family of PDA-type organizer devices. Unlike personal computers, which are general-purpose devices geared towards refining and processing information, PDAs are designed to capture, store and display information originating from various sources while a user in "on the go" or otherwise mobile. Additionally, while a certain level of skill is required to use a personal computer effectively, PDAs are designed with the novice and non-computer user in mind and are therefore intuitively easy to use.

A typical PDA includes a microprocessor, memory unit, a display, associated encoder circuitry, and a user interface generally provided in the form of a keyboard and selector buttons. A PDA can optionally contain an infrared emitter and wireless receiver. A graphical user interlace permits a user to store, retrieve and manipulate data via an interactive touch-sensitive display. A PDA can also include software that enables software applications for using a calendar, directory, calculator, games, and one or more multimedia programs. The calendar typically provides dates organized as rows and columns in the usual form. A directory contains entries consisting of a name field and a free form alphanumeric text field that can contain company names, addresses, telephone and fax numbers, email addresses, etc. Games and multimedia software features can vary.

A menu of icons displayed via the graphical user interface as part of the touch sensitive screen can permit a user to choose particular functions and directories. Some PDAs come equipped with a stylus, which is a plastic-tipped pen that a user utilizes to write digitally on the display area and tap particular graphically displayed icons; although a user's figure nail can accomplish the same. Each icon is indicative of a particular activity or function. Touch screen interfaces, however, are also increasingly being implemented with PDAs to permit a user to activate software modules in the form of routines and subroutines operable therein.

Although it was generally known before Jun. 27, 2000 that PDAs can be connected to a desktop personal computer or other PDAs via infrared, direct wire, or a single wireless communication links, PDAs and similar hand held devices were not available that could selectively link to more than one wireless connection for purposes of accessing remote multimedia data and multimedia data sources, such as the Internet and remote servers. PDAs were not provided that included more than one wireless transceiver module to enable remote access via 802.11, cellular, short/visible range (e.g., Bluetooth), infrared, and GPS resources, and also provide enhanced computing capabilities including the capability of processing and viewing multimedia data such as video broadcasts.

In the year 2000, the present inventors realized when they filed their patent applications that what would be needed in the future, among other things, was a electronic wireless hand held multimedia device that could connect to various data networks and establish short/visible range data connections with electronic devices located in close proximity, provide multimedia capabilities including remotely accessing and displaying of video, enabling access to email and multimedia content from the Internet including servers and the World Wide Web, determining location information and enable the determination and provision of directions to alternate location by accessing remote map information and displaying the map information on the display touch sensitive display screen, a technique which can be referred to as GPS mapping, and enable mobile payments through the device, for example, by enabling hand held device users to be billed a transaction fee via bank accounts (e.g., ATM, Debit and Credit cards) billing via communication service accounts or arrangements, and prepaid services, and other authorized account-related billing arrangements. A security module can be provided to enable protected data retrieval and management by enabling the use of pass codes, passwords and/or biometrics as well as communications security over communications signals during hand held device use. A video camera and video transmission capabilities enable user to capture, store, process and transmit video and take pictures.

BRIEF SUMMARY

One aspect of the present invention is to provide a vastly improved electronic wireless hand held multimedia device than what was publicly available prior to Jun. 27, 2000.

Another aspect of the present invention provides electronic wireless hand held multimedia device configured for the retrieval, processing and transmission of multimedia data to/from remote data resources over various wireless communications means.

It is yet another aspect of the present invention to provide an electronic wireless hand held multimedia device capable of communicating with a variety of different types of wireless networks.

It is yet another aspect of the present invention to provide an electronic wireless hand held multimedia device that includes a microprocessor and more than one wireless transceiver modules enabling wireless communications over a variety of communications standards, including Cellular (e.g., GSM, CDMA, GPRS, 3G), 802.11 (e.g., WLAN), and short range and/or line of sight range (e.g., Bluetooth, infrared, RFID), for the retrieval, processing and delivery of multimedia data to/from remote data resources (e.g., Internet, servers).

It is yet another aspect of the present invention that the hand held device can include any of the following: a touch sensitive display screen configured to display multimedia data including video, text and GPS maps, and accept user input; a cartridge reader configured to transfer data with an electronic cartridge; a GPS module configured to operate with mapping resources and provide location information in the form of GPS mapping; a mobile payment module enabling mobile payments via a variety of billing arrangements; a security module enabling protected data management and communications security; a video camera enabling the capture, storage, processing and transmission of video and pictures.

The above and other aspects of the present invention are achieved as will now be further described. An electronic wireless hand held multimedia device is disclosed, which includes more than one wireless transceiver modules configured for the receipt, processing and transmission of multimedia data to and from remote data resources over more than one standard of wireless communication. For example the electronic wireless hand held multimedia device includes a first wireless transceiver module configured to support bi-directional data communications of the electronic wireless hand held multimedia device with remote data resources over cellular telecommunications networks and standards (e.g., 3G, CDMA, GPRS, and GSM). The electronic wireless hand held multimedia device also includes a second wireless transceiver module configured to support bi-directional data communications of the electronic wireless hand held multimedia device with remote data resources over 802.11 communications standards and networks including wireless local area networks (WLAN). The electronic wireless hand held multimedia device can also include a third wireless transceiver module configured to support bi-directional data communications of the electronic wireless hand held multimedia device over a direct wireless connection with electronic devices located within short RF range or visible proximity of the electronic wireless hand held multimedia devices.

The electronic wireless hand held multimedia device can be equipped with a display screen configured to display data including video and text received by the electronic wireless hand held multimedia device. The electronic wireless hand held multimedia device can also include a user interface configured to accept user input into the electronic wireless hand held multimedia device. Additionally, the electronic wireless hand held multimedia device can also include a microprocessor configured to facilitate the operation of, and communications by, the electronic wireless hand held multimedia device.

The electronic wireless hand held multimedia device can additionally include a global positioning system (GPS) module configured to provide location information for the electronic wireless hand held multimedia device. The electronic wireless hand held multimedia device can also include a cartridge reader configured to transfer data with an electronic cartridge. Additionally, the third wireless transceiver module can be configured as a Bluetooth transceiver.

The electronic wireless hand held multimedia device can also include a fourth wireless transceiver module configured to support bi-directional data communications of the electronic wireless hand held multimedia device over an Infrared wireless connection with electronic devices located within visible proximity of the electronic wireless hand held multimedia device.

The electronic wireless hand held multimedia device can also include a fifth wireless transceiver module configured to support bi-directional data communications of the electronic wireless hand held multimedia device over an RFID wireless connection with electronic devices located within visible or short range from the electronic wireless hand held multimedia device.

A video camera and video transmission capabilities can be included that enable hand held device users to capture, store, process and transmit video and take pictures.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein;

DETAILED DESCRIPTION

Figure 1A:
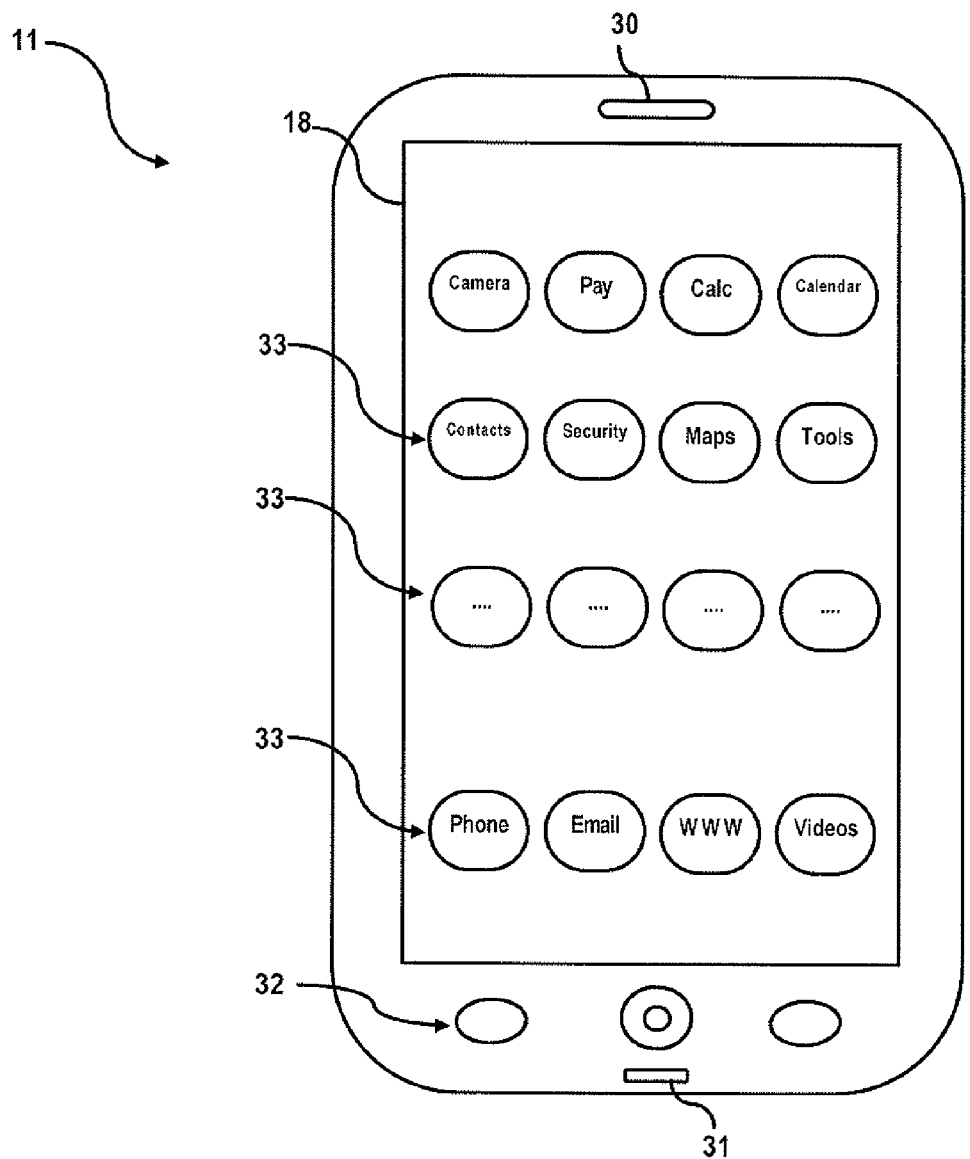
FIG. 1(a) illustrates a pictorial representation of an electronic wireless hand held multimedia device, which can be implemented in accordance with a preferred embodiment.

FIG. 1(a) illustrates a pictorial representation of an electronic wireless hand held multimedia device 11, which can be implemented in accordance with a preferred embodiment. Note that the device 11 can be referred to as a "handheld device", "hand held device" or a "wireless hand held device". Data can thus be transferred to and from the device 11. Note that as utilized herein, the term "data" as utilized herein generally refers to text, voice, graphics and/or video, but can include other types of data such as software, security codes, encryption, decryption, etc. Such data can include, for example, "multimedia data" such as video, voice, audio, etc.

In general, the electronic wireless hand held multimedia device 11 can include a touch sensitive display screen 18, a speaker 30, a microphone 31, and one or more control buttons 32 for controlling some operations of device 11. The device 11 depicted in FIG. 1(a) can be a device, such as, for example, a Personal Digital Assistant (PDA), a cellular telephone, a computing device capable of communicating with a wireless local area network, and so forth. In this respect, the device 11 can be implemented as a combined, PDNcellular telephone with touch screen capabilities associated with the display screen 18. Display screen 18 can be configured to display data including video and text and icons 33 operable as soft buttons providing options and action by the electronic wireless hand held multimedia device 11 when selected by a user.

Figure 1B:
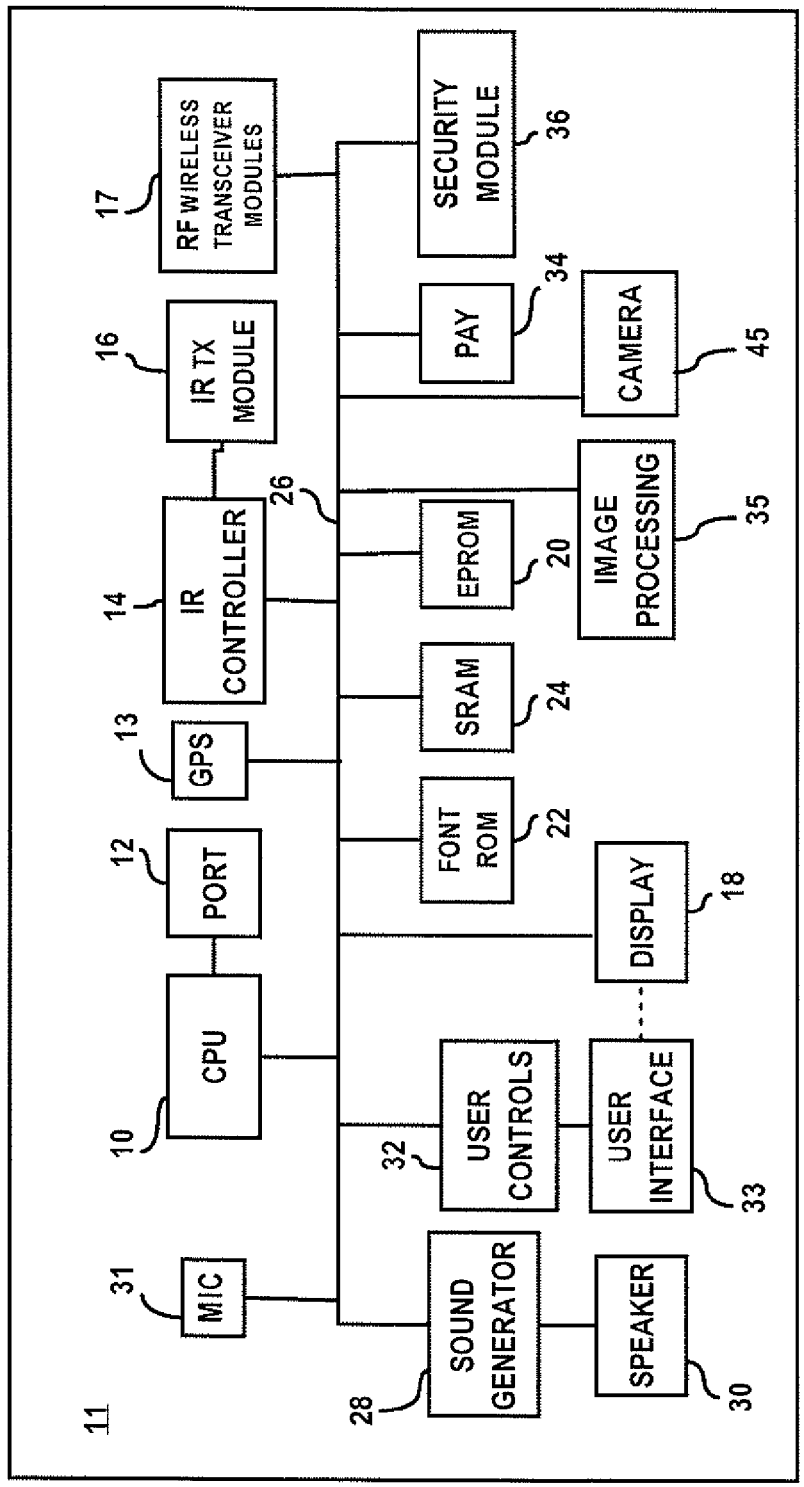
FIG. 1(b) depicts a schematic diagram illustrating exemplary hardware and software module configurations of an electronic wireless hand held multimedia device, which can be implemented in accordance with a possible embodiment.

FIG. 1(b) depicts a schematic diagram illustrating a general hardware configuration of an electronic wireless hand held multimedia device 11, which can be implemented in accordance with an embodiment. The diagram depicted in FIG. 1(b) illustrates a variety of hardware configurations and components/modules, which can be utilized to implement one possible embodiment of the device 11. Those skilled in the art can appreciate, however, that other hardware configurations with less or more hardware and/or modules can be utilized in carrying out the electronic wireless hand held multimedia device 11 of the present invention, as will be further described herein. Note that in FIGS. 1(a) to 5, identical or similar parts or elements are generally indicated by identical reference numerals. It can be appreciated that FIGS. 1(a) to 5 may refer to the same device 11, the varying illustrations and configurations depicted in FIGS. 1(a) to 5 can represent variations or alternative embodiments of the same device 11.

The electronic wireless hand held multimedia device 11 is capable of carrying out a variety of functionalities. For example, microprocessor shown as CPU 10 of electronic wireless hand held multimedia device 11, can function as a main controller operating under the control of operating clocks supplied from a clock oscillator. CPU 10 can be configured as, for example, a microprocessor. Such a microprocessor can be configured to facilitate operation of and communications by the electronic wireless hand held multimedia device 11. External pins of CPU 10 can be coupled to an internal bus 26 so that it can be interconnected to respective components.

The electronic wireless hand held multimedia device 11 can also be configured to include, for example, SRAM 24 which can be provided as a writeable memory that does not require a refresh operation and can be generally utilized as a working area of CPU 10. SRAM (Static RAM) is generally a form of semiconductor memory (RAM) based on a logic circuit known as a flip-flop, which retains information as long as there is enough power to run the device. Font ROM 22 can be configured as a read only memory for storing character images (e.g., icons and font) displayable on a display 18, which can be implemented as, for example, a touch sensitive display screen. Examples of types of displays that can be utilized in accordance with display 18 include, for example, a TFT active matrix display, an illuminated LCD (Liquid Crystal Display), or other small-scaled displays being developed or available in the art in compact form.

CPU 10 can be utilized to drive display 18 utilizing, among other media, font images from Font ROM 22, and images transmitted as data through wireless unit 17 and processed by image-processing unit 35. EPROM 20 can be configured as a read only memory that is generally erasable under certain conditions and can be utilized for permanently storing control codes for operating respective hardware components and security data, such as a serial number. A camera capable of capturing video and pictures can be provided and can also work in conjunction with image processing unit 35.

IR controller 14 can be generally configured as a dedicated controller for processing infrared codes transmitted/received by an IR transceiver module 16 and for capturing the same as computer data. Wireless unit 17 can be generally configured as a dedicated controller and transceiver module for processing all wireless data transmitted from and to a wireless communications network, such as wireless communication network 152, which is described in greater detail herein, but not shown in FIG. 1.

Figure 1C:
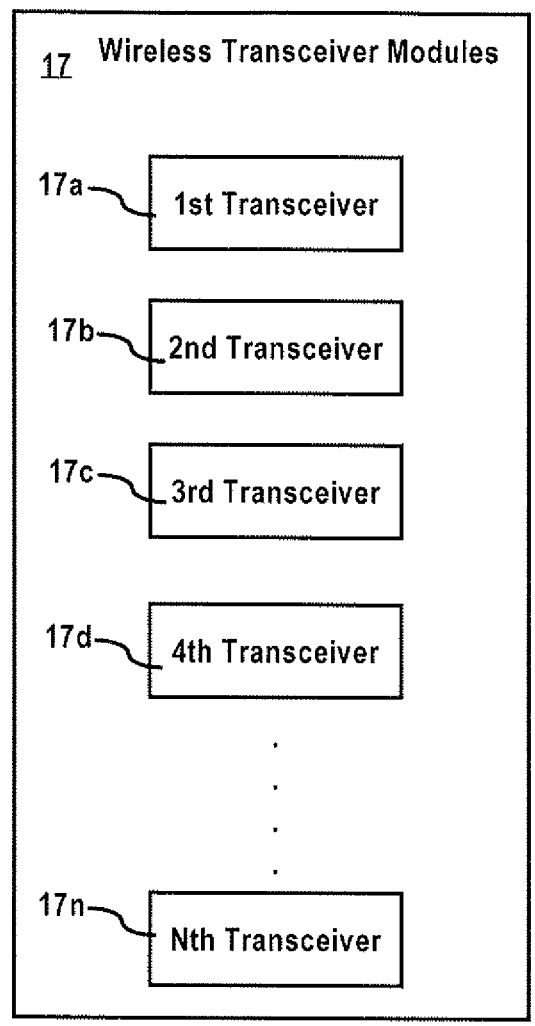
FIG. 1(c) illustrates a block diagram of wireless transceiver modules that can be configured for use with the electronic wireless hand held multimedia device described herein, in accordance with an alternative embodiment.

Note that the radio frequency (RF) wireless transceiver modules 17 (i.e. transceiver module) can constitute more than one wireless transceiver (e.g., multiple transceivers) formed separately or combined on an ASIC or DSP circuit. For example, FIG. 1(c) illustrates a block diagram of RF wireless transceiver modules 17 configured for use with the electronic wireless hand held multimedia device 11, in accordance with an alternative embodiment, including, for example, a first transceiver module 17a, a second transceiver module 17b, a third transceiver module 17c, a fourth transceiver module 17d, and up to an "$n^{th}$" transceiver module, and so on.

The first wireless transceiver module 17a can be configured, for example, to support bi-directional data communications of the electronic wireless hand held multimedia device 11 with remote data resources over cellular telecommunications networks. Wireless unit/transceiver module 17 can also include the second wireless transceiver module 17b configured to support bi-directional data communications of the electronic wireless hand held multimedia device 11 with remote data resources over a wireless local area network. Additionally, wireless transceiver module 17 can include the third wireless transceiver module 17c configured to support bi-directional data communications of the electronic wireless hand held multimedia device 11 over a direct wireless connection with electronic devices located at short range, for example, within up to a fifty to hundred foot range from the electronic wireless hand held multimedia device 11. Additionally, wireless unit/transceiver module 17 can include the fourth wireless transceiver module 17d configured to support bi-directional data communications of the electronic wireless hand held multimedia device 11 over an infrared wireless connection with electronic devices located at line of sight (or "visible") range, which can reasonably be within up to a fifty foot range from the electronic wireless hand held multimedia device 11. It can be appreciated that other variations for wireless transceiver module 17 can also be provided.

Port 12 can be connected to CPU 10 and can be temporarily attached, for example, to a docking station to transmit information to and from electronic wireless hand held multimedia device 11 to other devices, such as personal computers, points of sale such as retail cash registers, electronic kiosk devices, and so forth. Port 12 can also be configured, for example, to link with a modem, cradle or docking station, which is well known in the art, and can permit network devices, a personal computer or other computing devices to communicate with electronic wireless hand held multimedia device 11.

User controls can 32 permits a user to enter data to electronic wireless hand held multimedia device 11 and initiate particular processing operations via CPU 10. A user interface 33 can be linked to user controls 32 to permit a user to access and manipulate electronic wireless hand held multimedia device 11 for a particular purpose, such as, for example, viewing video images on display 18. Those skilled in the art will appreciate that user interface 33 can be implemented as a touch screen user interface, as indicated by the dashed lines linking display 18 with user interface 33. User interface 33 can be configured to accept user input into the electronic wireless hand held multimedia device 11.

In addition, CPU 10 can cause a sound generator 28 to generate sounds of predetermined frequencies from a speaker 30. Speaker 30 can be utilized to produce music and other audio information associated with video data transmitted to electronic wireless hand held multimedia device 11 from an outside source. Additionally, a GPS (Global Positioning System) module 13 can also be connected to bus 26. GPS module 13 can be configured to provide location information for the electronic wireless hand held multimedia device 11 and can operate with mapping software and resources to provide navigable directions on the display screen 18 to the user, which can be referred to as GPS mapping.

Those skilled in the art can appreciate that additional electronic circuits or the like other than, or in addition to, those illustrated in FIG. 1 can be required to construct electronic wireless hand held multimedia device 11. PDAs can be modified to (e.g., with proper authentication, filters, security codes, biometrics or the like) receive RF transmissions from at least one source (e.g., server, a wireless camera, or data from a camera transmitted wirelessly through a local data transmitter using Wi-Fi). Those skilled in the art can thus appreciate that because of the brevity of the drawings described herein, only a portion of the connections between the illustrated hardware blocks is generally depicted. In addition, those skilled in the art will appreciate that electronic wireless hand held multimedia device 11 can be implemented as a specific type of a hand held device, such as a Personal Digital Assistant (PDA), paging device, WAP-enabled mobile phone, and other associated hand held computing devices well known in the art.

Electronic wireless hand held multimedia device 11 can be configured to permit images, such as broadcasted video images or other multimedia data, to be displayed on display 18 for a user to view. Electronic wireless hand held multimedia device 11 thus includes an image-processing unit 35 for processing images transmitted as data to electronic wireless hand held multimedia device 11 through wireless unit 17. A payment module 34, can be implemented in the device 11 to enable the management of payment transactions which can be negotiated wirelessly through the device, for example, by enabling hand held device users to be billed a transaction fee via bank accounts (e.g., ATM, Debit and Credit cards) billing via communication service accounts or arrangements, and prepaid services, and other authorized account-related billing arrangements. Payment can be made directly to a wireless point of sale and/or over data networks. A security module can be provided to enable protected data retrieval and management by enabling the use of pass codes, passwords and/or biometrics and communications security during hand held device communications. A video camera and video transmission capabilities enable user to capture, store, process and transmit video and take pictures. Payment module 34 can be linked through internal bus 26 to CPU 10. Additionally, a security module 36 can be utilized to process proper security codes to thereby ensure data (e.g., multimedia data) transferred to and from electronic wireless hand held multimedia device 11 can be secured and/or access can be permitted. Security unit 36 can be implemented as an optional feature of electronic wireless hand held multimedia device 11. Security unit 36 can also be configured with routines or subroutines that are processed by CPU 10, and which prevent wireless data from being transmitted/received from electronic wireless hand held multimedia device 11 beyond a particular frequency range, outside of a particular geographical area associated with a local wireless network, or absent authorized authorization codes (e.g., decryption).

Those skilled in the art can appreciate that although electronic wireless hand held multimedia device 11 is generally illustrated in FIG. 1, electronic wireless hand held multimedia device 11 can be implemented as a wireless application protocol (WAP), web-enabled cellular hand held device, such as a PDA, wireless telephone, or a combination thereof. Electronic wireless hand held multimedia device 11 can be configured with features of combination cellular telephone/PDA devices. Electronic wireless hand held multimedia device 11 can also permits users to access e-mail and store calendars and contact databases. Electronic wireless hand held multimedia device 11 can also be configured to include the use of multi-RF (Radio Frequency) receiverenabled hand held television viewing device. Regardless of the type of hand held device implemented, it can be expected that such a hand held devices will be adapted to receive and process data via image-processing unit 35 for ultimate display as moving images (video) on display 18, in accordance with the present invention. Image-processing unit 35 can include image-processing routines, subroutines, software modules, and so forth, which perform image-processing operations.

Figure 2:
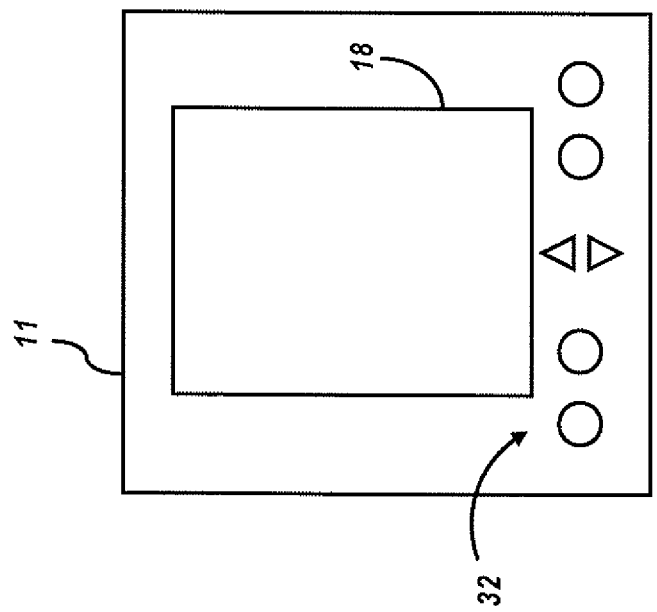
FIG. 2 illustrates a pictorial representation of an electronic wireless hand held multimedia device, which can be implemented in accordance with an alternative embodiment.

FIG. 2 illustrates a pictorial representation of electronic wireless hand held multimedia device 11, which can be utilized to implement a preferred embodiment. Electronic wireless hand held multimedia device 11 includes display screen 18. Multimedia data (e.g., video, audio, graphics, etc) broadcast via radio frequency or provided digitally and wirelessly can be displayed on display screen 18 for a user to view. User controls 32 permit a user to manipulate images or text displayed on display screen 18, such as the buttons on a keyboard provided on most Blackberry devices. A touch screen user interface can be further configured on the display screen 18 with electronic wireless hand held multimedia device 11 to permit a user to manipulate images/text displayed on display screen 18.

Figure 3:
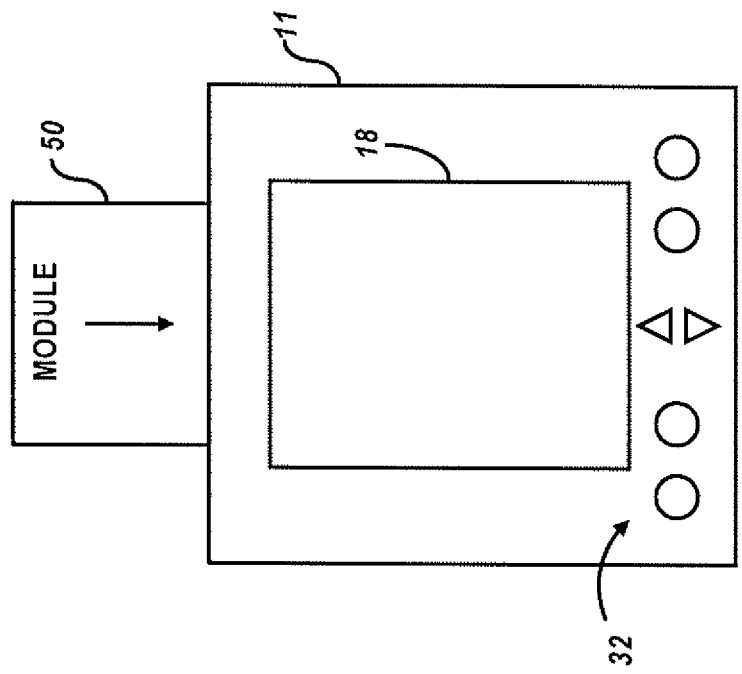
FIG. 3 illustrates a pictorial representation of an electronic wireless hand held multimedia device adapted for receiving a cartridge, in accordance with an alternative embodiment.

FIG. 3 depicts a pictorial representation of electronic wireless hand held multimedia device 11 adapted for receiving a cartridge 50, in accordance with an alternative embodiment. Electronic wireless hand held multimedia device 11 of FIG. 3 is generally analogous to electronic wireless hand held multimedia device 11 of FIG. 2, the difference being that electronic wireless hand held multimedia device 11 of FIG. 3 can be adapted to receive a cartridge bearing software and/or hardware modules (including memory) that permits electronic wireless hand held multimedia device 11 of FIG. 3 to function according to specific hardware and/or instructions contained in a memory location within cartridge 50. The alternative embodiment depicted in FIG. 3 thus represents a variation to the embodiment illustrated in FIG. 2.

Cartridge 50 can be configured as a smart card of another appropriate module. Such a smart card can provide, for example, access codes (e.g., decryption) to enable electronic wireless hand held multimedia device 11 to receive data broadcasts. Note that as utilized herein, the term "module" can refer to a physical module, such as a cartridge. The term "module" can also refer to electronics and hardware stored on a cartridge. The term "module" can also refer to a software module composed of routines or subroutines that perform a particular function. Those skilled in the art can appreciate the meaning of the term module is based on the context in which the term is utilized. Thus, cartridge 50 can be generally configured as a physical cartridge or smart card. The term "module" as utilized herein can also refer to a software module, depending on the context of the discussion thereof.

To illustrate the use of a physical module, such as module 50, assume that a user can possess several such physical modules or cartridges. One cartridge, when inserted into hand held device FIG. 3 can instruct hand held device 11 to function as a standard PDA, such as a Palm Pilot type device. Other functions including communications, software, memory and supplemental circuitry can be provided using a cartridge that can be inserted within and removed from the electronic wireless hand held multimedia device 11.

Those skilled in the art can thus appreciate that electronic wireless hand held multimedia device 11 can be adapted to receive and cooperate with cartridge 50. Additionally, electronic wireless hand held multimedia device 11 includes display screen 18, which is similar to display unit 18 of FIG. 1. Electronic wireless hand held multimedia device 11 depicted in FIG. 3 can also include user controls 32. Thus, electronic wireless hand held multimedia device 11 can also implement touch screen capabilities through a touch screen user interface integrated with display screen 18.

Assuming cartridge 50 is implemented as a smart card, it is anticipated that similar features can be implemented in accordance with the smart card to insure that hand held device 11 includes touch screen user interface 18 and video viewing capabilities. Smart cards are generally known in the art as credit-card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards can be generally configured as either a contact or contactless smart card, or a combination thereof. A contact smart card requires insertion into a smart card reader (e.g., contained within hand held device 11) with a direct connection to, for example, a conductive micromodule on the surface of the card. Such a micromodule can be generally gold plated. Transmission of commands, data, and card status takes place through such physical contact points.

A contactless card requires only close proximity to a reader. Both the reader and the card can be implemented with antenna means providing a contactless link that permits the devices to communicate with one another. Contactless cards can also maintain internal chip power or an electromagnetic signal (e.g., RF tagging technology). Two additional categories of smart codes, well known in the art, which are based on contact and contactless cards are the so-called Combi cards and Hybrid cards.

A Hybrid card generally can be equipped with two chips, each with a respective contact and contactless interface. The two chips are not connected, but for many applications, this Hybrid serves the needs of consumers and card issuers. The Combi card can be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized with low to medium security requirements. A microprocessor chip can add, delete and otherwise manipulate information in its memory. Microprocessor-based memory cards typically contain microprocessor chips with a variety of architectures.

The electronic wireless hand held multimedia device 11 of FIGS. 1-3 can be configured as a hand held device adapted for use with a cartridge/module, such as module 50. The cartridge/module 50 can contain the electronics (e.g., tuner, filter, etc.) to allow a hand held device to be adapted for receiving multimedia data. Electronic wireless hand held multimedia device 11 includes a display screen 18 for the display of multimedia data. Additionally, display screen 18 of electronic wireless hand held multimedia device 11 can be configured with a touch screen user interface displayable and operable on display screen 18. Display screen 18 can include one or more touch screen areas.

Figure 4:
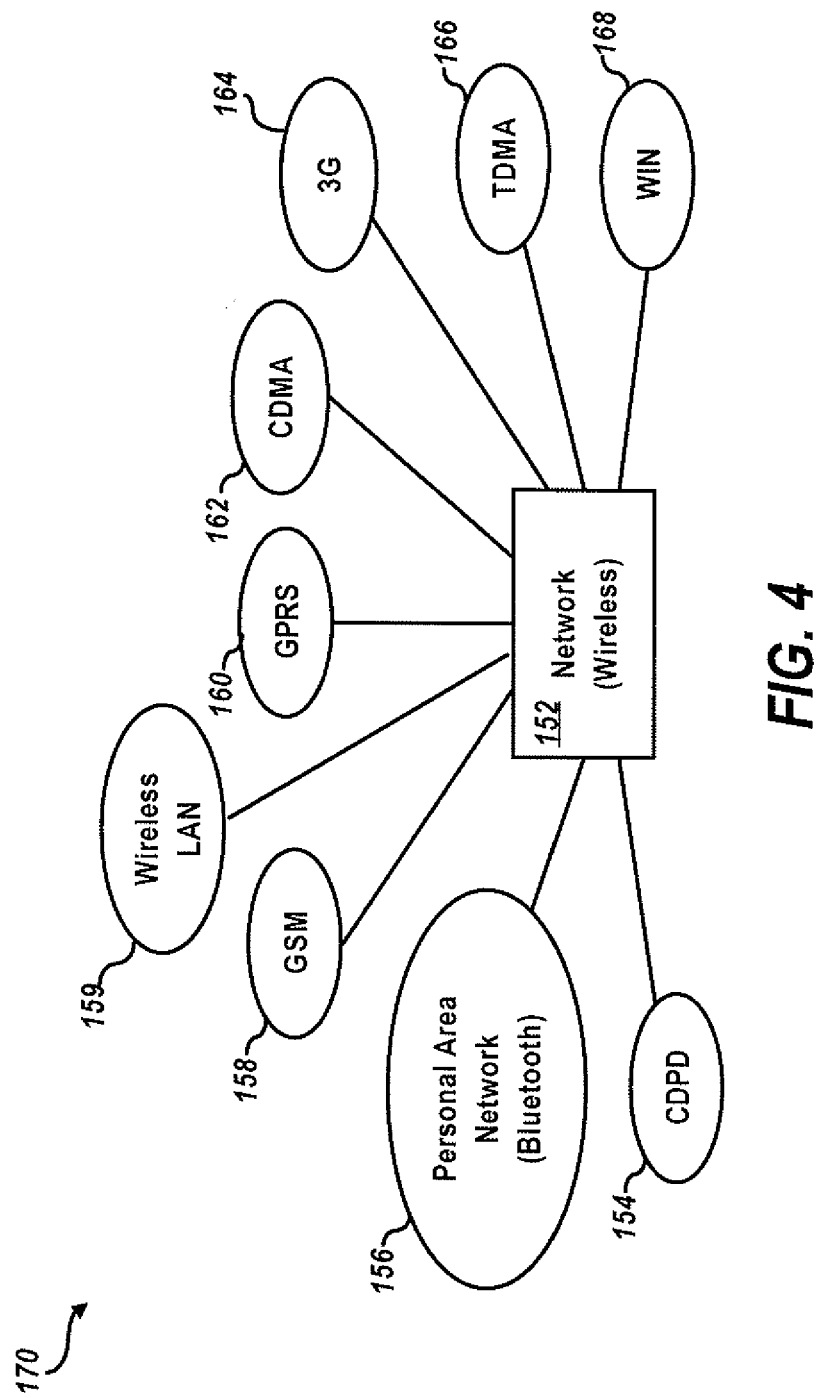
FIG. 4 illustrates a diagram depicting network attributes of wireless communications networks that can be utilized in accordance with the preferred embodiments.

Those skilled in the art can appreciate that a variety of possible wireless communications and networking configurations can be utilized to implement wireless network 152, as shown in FIG. 4. Wireless network 152 can be, for example, implemented according to a variety of wireless protocols, including cellular, Bluetooth, and RF or direct IR communications. Wireless network 152 can be implemented as a single network type (e.g., Bluetooth) or a network based on a combination of network types (e.g., GSM, CDMA, etc).

Wireless network 152 can be configured with teachings/aspects of CDPD (Cellular Digital Packet Data) networks well known in the networking arts. CDPD network 154 is illustrated in FIG. 4. CDPD can be configured as a TCP/IP based technology that supports Point-to-Point (PPP) or Serial Line Internet Protocol (SLIP) wireless connections to mobile devices, such as the hand held devices described and illustrated herein. Cellular service is generally available throughout the world from major service providers. Data can be transferred utilizing CDPD protocols.

Current restrictions of CDPD are not meant to limit the range or implementation of the method and system described herein, but are described herein for illustrative purposes only. It is anticipated that CDPD will be continually developed, and that such new developments can be implemented in accordance with the present invention.

Wireless network 152 can preferably be also configured with teachings/aspects of a Personal Area Network 156 or Bluetooth, as described herein. Bluetooth was adopted by a consortium of wireless equipment manufacturers referred to at the Bluetooth Special Interest Group (BSIG), and has emerged as a global standard for low cost wireless data and voice communication. Current specifications for this standard call for a 2.4 GHz ISM frequency band. Bluetooth technology is generally based on a short-range radio transmitter/receiver built into small application specific circuits (ASICS, DSPs) and embedded into support devices, such as the hand held devices described and illustrated herein. It should be appreciated that all the wireless transceiver modules and capabilities described herein can be built into small application specific circuits (ASICS, DSPs) and embedded into support devices, such as the hand held devices described and illustrated herein.

The Bluetooth standard permits up to 100 mw of power, which can increase the range to 100 M. In addition, Bluetooth can support several data channels. Utilizing short data packets and frequency hopping of up to 1600 hops per second, Bluetooth is a wireless technology that can be utilized to enable the implementation of the methods and systems described herein. Current restrictions of Bluetooth are not meant to limit the range or implementation of the present invention, but are described herein for illustrative purposes only. It is anticipated Bluetooth will be continually developed, and that such new developments can be implemented in accordance with the present invention.

Wireless network 152 can also be configured utilizing teachings/aspects of GSM network 158. GSM (Global System for Mobile Communication) and PCS (Personal Communications Systems) networks, both well known in the telecommunications arts, generally operate in the 800 MHz, 900 MHz, and 1900 MHz range. PCS initiates narrowband digital communications in the 900 MHz range for paging, and broadband digital communications in the 1900 MHz band for cellular telephone service. In the United States, PCS 1900 is generally equivalent to GSM 1900. GSM operates in the 900 MHz, 1800-1900 MHz frequency bands, while GSM 1800 is widely utilized throughout Europe and many other parts of the world.

In the United States, GSM 1900 is generally equivalent to PCS 1900, thereby enabling the compatibility of these two types of networks. Current restrictions of GSM and PCS are not meant to limit the range or implementation of the present invention, but are described herein for illustrative purposes only. It is anticipated that GSM and PCS will be continually developed, and that aspects of such new developments can be implemented in accordance with the present invention.

Wireless network 152 can also be, for example, a wireless LAN (Local Area Network). In other embodiments or implementations, wireless network 152 can also utilize teachings/aspects of GPRS network 160. GPRS technology, well-known in the telecommunications arts, bridges the gap between current wireless technologies and the so-called "next generation" of wireless technologies referred to frequently as the third-generation or 3G wireless technologies. GPRS is generally implemented as a packet-data transmission network that can provide data transfer rates up to 115 Kbps. GPRS can be implemented with CDMA and TDMA technology and supports X.25 and IP communications protocols, all well known in the telecommunications arts. GPRS also enables features, such as Voice over IP (VoIP) and multimedia services. Current restrictions of GPRS are not meant to limit the range or implementation of the present invention, but are described herein for illustrative purposes only. It is anticipated that GPRS will be continually developed and that such new developments can be implemented in accordance with the present invention.

Wireless network 152 can also be implemented utilizing teaching/aspects of a CDMA network 162 or CDMA networks. CDMA (Code Division Multiple Access) is a protocol standard based on IS-95 CDMA, also referred to frequently in the telecommunications arts as CDMA-1. IS-95 CDMA is generally configured as a digital wireless network that defines how a single channel can be segmented into multiple channels utilizing a pseudo-random signal (or code) to identify information associated with each user. Because CDMA networks spread each call over more than 4.4 trillion channels across the entire frequency band, it is much more immune to interference than most other wireless networks and generally can support more users per channel.

CDMA can support data. Wireless network 152 can be configured with a form of CDMA technology known as wideband CDMA (W-CDMA). Wideband CDMA can be also referred to as CDMA 2000 in North America. W-CDMA can be utilized to increase transfer rates utilizing multiple 1.25 MHz cellular channels. Current restrictions of CDMA and W-CDMA are not meant to limit the range or implementation of the present invention, but are described herein for illustrative purposes only. It is anticipated that CDMA and W-CDMA will be continually developed and that such new developments can be implemented in accordance with the present invention.

Wireless network 152 can be also implemented utilizing teachings/aspects of a 3G wireless communications network 164. As a result of increased competition and the ongoing convergence of voice and data networks, new solutions and services are becoming available in the wired and wireless communications fields. Third Generation communications technology (also referred to in the art as 3G or IMT-2000), for example, is currently expected to bring wireless communication users the next generation of wireless technology. 3G is characterized by high-speed, high-bandwidth services that will support a wide variety of wireless applications, including wireline quality voice and high-resolution video. 3G is an initiative of the International Telecommunication Union (ITU) that seeks to integrate the various satellites, terrestrial, fixed and mobile systems currently deployed and being developed under a single standard or family of standards to promote global communication service capabilities and interoperability.

Wireless network 152 can also be configured utilizing teachings/aspects of TDMA networks 166. TDMA (Time Division Multiple Access) is a telecommunications network utilized to separate multiple conversation transmissions over a finite frequency allocation of through-the-air bandwidth. TDMA can be utilized in accordance with the present invention to allocate a discrete amount of frequency bandwidth to each user in a TDMA network to permit many simultaneous conversations or transmission of data. Each user can be assigned a specific timeslot for transmission. A digital cellular communications system that utilizes TDMA typically assigns 10 timeslots for each frequency channel.

A hand held device operating in association with a TDMA network sends bursts or packets of information during each timeslot. Such packets of information are then reassembled by the receiving equipment into the original voice or data/information components. Current restrictions of such TDMA networks are not meant to limit the range or implementation of the present invention, but are described herein for illustrative purposes only. It is anticipated that TDMA networks will be continually developed and that such new developments can be implemented in accordance with the present invention.

Wireless network 152 can also be configured utilizing teachings aspects of Wireless Intelligent Networks (WINs) 168. WINs are generally known as the architecture of the wireless switched network that allows carriers to provide enhanced and customized services for mobile telephones. Intelligent wireless networks generally include the use of mobile switching centers (MSCs) having access to network servers and databases such as Home Location Registers (HLRs) and Visiting Location Registers (VLRs), for providing applications and data to networks, service providers and service subscribers (wireless device users).

Local number portability allows wireless subscribers to make and receive calls anywhere—regardless of their local calling area. Roaming subscribers are also able to receive more services, such as call waiting, three-way calling and call forwarding. A HLR is generally a database that contains semi-permanent mobile subscriber (wireless device user) information for wireless carriers' entire subscriber base.

A useful aspect of WINs for the present invention is enabling the maintenance and use of customer profiles within an HLR/VLR-type database. Profile information can be utilized for example with season ticket holders and/or fans of traveling teams or shows. HLR subscriber information as used in WINs includes identity, service subscription information, location information (the identity of the currently serving VLR to enable routing of communications), service restrictions and supplementary services/information. HLRs handle SS7 transactions in cooperation with Mobile Switching Centers and VLR nodes, which request information from the HLR or update the information contained within the HLR. The HLR also initiates transactions with VLRs to complete incoming calls and update subscriber data. Traditional wireless network design is generally based on the utilization of a single HLR for each wireless network, but growth considerations are prompting carriers to consider multiple HLR topologies.

The VLR can be also configured as a database that contains temporary information concerning the mobile subscribers currently located in a given MSC serving area, but whose HLR can be elsewhere. When a mobile subscriber roams away from the HLR location into a remote location, SS7 messages are used to obtain information about the subscriber from the HLR, and to create a temporary record for the subscriber in the VLR.

Signaling System No. 7 (referred to as SS7 or C7) is a global standard for telecommunications. In the past the SS7 standard has defined the procedures and protocol by which network elements in the public switched telephone network (PSTN) exchange information over a digital signaling network to affect wireless and wireline call setup, routing, control, services, enhanced features and secure communications. Such systems and standards can be utilized to implement wireless network 152 in support of wireless customers, in accordance with the present invention.

Improved operating systems and protocols allow a Graphical User Interfaces (GUI) to provide an environment that displays user options (e.g., graphical symbols, icons or photographs) on the display screen 18 of the electronic wireless hand held multimedia device 11. Extensible Markup Language ("XML") is a standard that is available that performs as a universal language for data, making documents more interchangeable. XML allows information to be used in a variety of formats for different devices, including PCs, PDAs and web-enabled mobile phones.

XML enables documents to be exchanged even where the documents were created and/or are generally used by different software applications. XML can effectively enable one system to translate what another system sends. As a result of data transfer improvements, wireless device GUIs can be utilized in accordance with a hand held device and wireless network 152, whether configured as a paging network or another network type, to render images on the hand held device that closely represent the imaging capabilities available on desktop computing devices.

Figure 5:
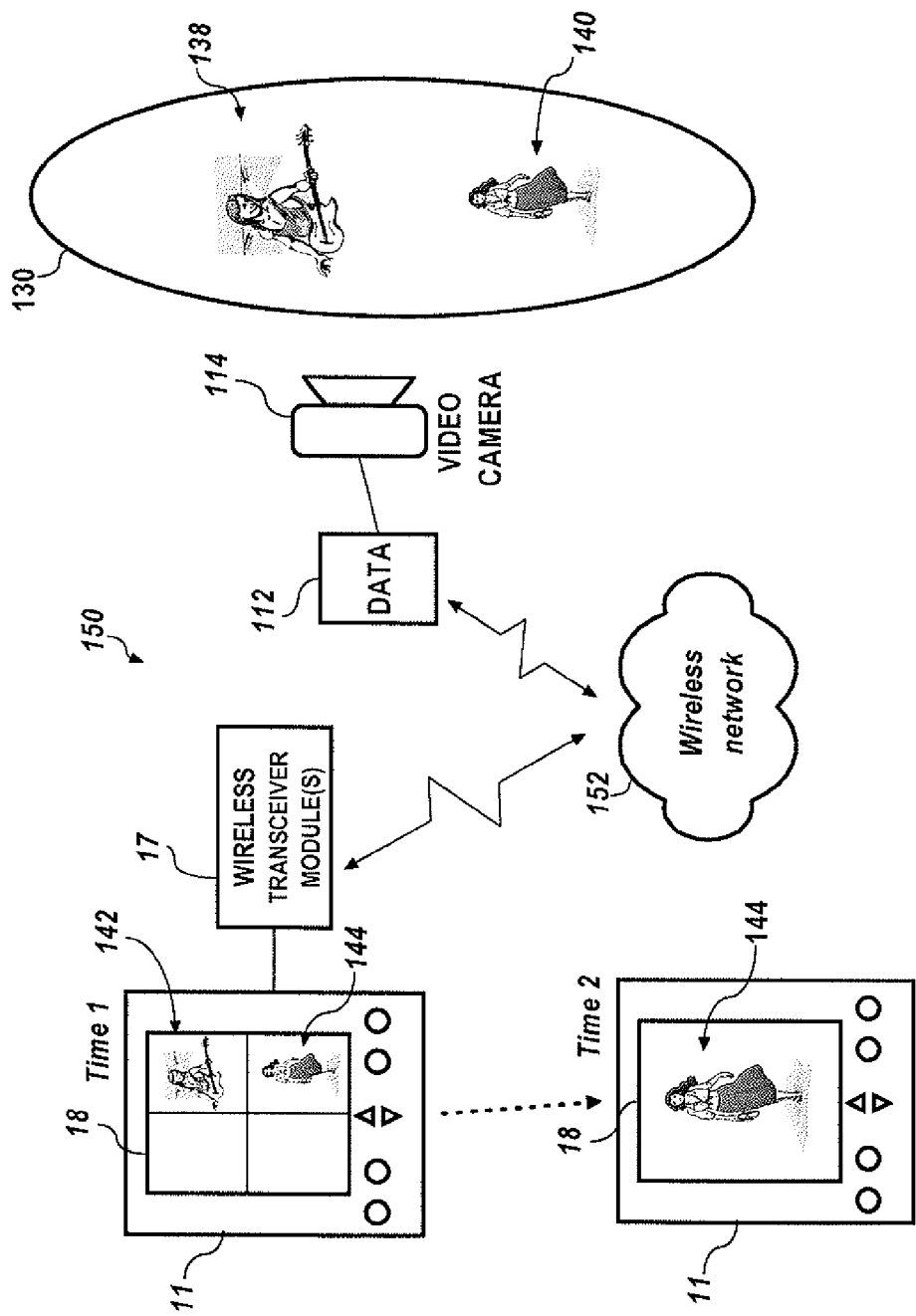
FIG. 5 illustrates a diagram of one example of a system for providing multimedia data to electronic wireless hand held multimedia device, in accordance with an alternative embodiment.

FIG. 5 illustrates a diagram of a system 150 providing multimedia data to electronic wireless hand held multimedia device wherein the multimedia data is received and processed for display, in accordance with the embodiments. Note that in FIGS. 1-5, identical or similar parts or elements are generally indicated by identical reference numerals. Multimedia data can be created or captured, for example, as shown in FIG. 5 by a video camera 114, from live activity 130, such as a concert 138 or private activities 140. The multimedia data can be stored on a server 112 as data wherefrom it can be retrieved through a data network 152 by the wireless handheld device 11. The data network 152 can include a wireless network as described herein before such as a cellular data network, 802.11 networks, or another type of data transmissions such as indicated in FIG. 4. Data network 152 can include, for example, the use of a gateway configured as an access point for a wireless LAN (Local Area Network). Access points for wireless LAN networks and associated wired and wireless hardware (e.g., servers, routers, gateways, etc.) can be utilized in accordance with the present invention described herein. In the example depicted in FIG. 5, an electronic wireless hand held device user can desire to obtain multimedia data (e.g., video, audio, etc) being broadcast from a multimedia data source 130, for example, a live entertainment venue shown as an example remote data source 130 in FIG. 5, which can be concert hall or sports stadium.

Hand held device 11 can be configured to communicate with and receive transmissions from remote data sources 112 over data networks 152 based on device identification (e.g., device address). Communication with hand held devices, such as hand held device 11, however, can also be achieved through RF (Radio Frequency) broadcasts, thereby not requiring two-way communication and authentication between, for example, a wireless LAN network and such hand held devices. A broadcast under such a scenario can also require that such a hand held device or hand held devices possess decryption capabilities or the like in order to be authorized to receive transmissions from a remote data resource. More than one wireless transceiver module 17, as explained previously, are integrated within hand held device 11 to enable access to multimedia data over various wireless communications means.

In one aspect of the scenario depicted in FIG. 5, a live activity instead of recorded media can be accessed and viewed using an electronic wireless hand held multimedia device 11. In a live scenario, one or more video cameras 114 can be positioned at a live entertainment venue as the data resource 130 at locations that capture images not only of the events taking place on a concert stage, but also events taking place within the venue itself. For example, if an audience member 140 happens to be walking along a stadium aisle within view of video camera 114, the audience member's video image can be captured and displayed as video image 144 within display screen 18 of hand held device 11, as indicated at Time 1. Likewise, video camera 114 can capture images of band member 138 whose video image can be displayed as video image 142 within a display area of display screen 18, as indicated at Time 1. Thus, a user of hand held device 11 can view not only the events taking place on a central performing platform of venue, but also other events within the arena itself. The user of device 11 can be located within a venue or many miles, perhaps, thousands of miles away, from a venue. The band member 138 can be located on a central performing platform (not shown) of a multimedia data source 130 in the form of a venue when video camera 114 captures video of band member 138. The user can also, for example, wish to see a close-up of audience member 140. By activating user controls and/or a touch screen interface integrated with display screen 18, the user can, for example, pan or zoom to view a close-up video shot of audience member 140, as indicated at Time 2. Captured video images can be transferred from video camera 114 as video data to hardware 112 such as a server. From the server 112, video can be accessed and transferred over the wireless network 152 to the device 11.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An electronic wireless hand held multimedia device, comprising:
   at least one of a wireless unit and a tuner unit supporting bi-directional data communications of data including video and text for the electronic wireless hand held multimedia device with remote data resources over cellular telecommunications networks, over wireless local area networks and over a direct wireless connection with electronic devices located within short range using short range RE (Radio Frequency) communications after accepting a passcode from a user of the multimedia device during the communications;
   a touch sensitive display screen configured to display the data including video and text received by the electronic wireless hand held multimedia device by selecting a particular data represented by a soft button on the touch sensitive display screen of the multimedia device;
   a microprocessor configured to facilitate operation of and communications by the electronic wireless hand held multimedia device; and
   a video camera enabling the capture, storage, processing, and transmission of video and pictures.

2. The electronic wireless hand held multimedia device of claim 1, further comprising a global positioning module configured to provide location information for the electronic wireless hand held multimedia device.

3. The electronic wireless hand held multimedia device of claim 1, further comprising a cartridge reader configured to transfer data with an electronic cartridge.

4. The electronic wireless hand held multimedia device of claim 2, further comprising a cartridge reader configured to transfer data with an electronic cartridge.

5. The electronic wireless hand held multimedia device of claim 1, further comprising a mobile payment module enabling mobile payments via a variety of billing arrangements.

6. The electronic wireless hand held multimedia device of claim 1, further comprising a security module enabling protected data management and communications security.

7. The electronic wireless hand held multimedia device of claim 1, further comprising a wireless infrared transceiver supporting bi-directional line-of-site data communications of the electronic wireless hand held multimedia device over an Infrared wireless connection with electronic devices located within line of sight from the electronic wireless hand held multimedia device.

8. An electronic wireless hand held multimedia device, comprising:
   at least one of a wireless unit and a tuner unit supporting bi-directional data communications of data including video and text for the electronic wireless hand held multimedia device with remote data resources over cellular telecommunications networks, over wireless local area networks and over a direct wireless connection with electronic devices located within short range using short range RF data communications after accepting a passcode from a user of the multimedia device during the communications;
   a touch sensitive display screen configured to display the data including video and text received by the electronic wireless hand held multimedia device by selecting a particular data represented by a soft button on the touch sensitive display screen of the multimedia device;
   a microprocessor configured to facilitate operation of and communications by the electronic wireless hand held multimedia device;
   a video camera enabling the capture, storage, processing and transmission of video and pictures; and
   a global positioning module configured to provide location information for the electronic wireless hand held multimedia device.

9. The electronic wireless hand held multimedia device of claim 8, further comprising a cartridge reader configured to transfer data with an electronic cartridge.

10. The electronic wireless hand held multimedia device of claim 8, further comprising a mobile payment module enabling mobile payments via a variety of billing arrangements.

11. The electronic wireless hand held multimedia device of claim 8, further comprising a security module enabling protected data management and communications security.

12. The electronic wireless hand held multimedia device of claim 8, further comprising a wireless infrared transceiver supporting bi-directional line-of-site data communications of the electronic wireless hand held multimedia device over an Infrared wireless connection with electronic devices located within line of sight from the electronic wireless hand held multimedia device.

13. The electronic wireless hand held multimedia device of claim 12, further comprising a mobile payment module enabling mobile payments via a variety of billing arrangements.

14. The electronic wireless hand held multimedia device of claim 12, further comprising a security module enabling protected data management and communications security.

15. An electronic wireless hand held multimedia device, comprising:
- at least one of a wireless unit and a tuner unit supporting bi-directional data communications of data including video and text for the electronic wireless hand held multimedia device with remote data resources over cellular telecommunications networks, over wireless local area networks and over a direct wireless connection with electronic devices located within short range using short range RF (Radio Frequency) communications after accepting a passcode from a user of the multimedia device during the communications;
- a touch sensitive display screen configured to display the data including video and text received by the electronic wireless hand held multimedia device by selecting a particular data represented by a soft button on the touch sensitive display screen of the multimedia device;
- a microprocessor configured to facilitate operation of and communications by the electronic wireless hand held multimedia device; and
- a mobile payment module enabling the management of payment transactions wirelessly utilizing said electronic wireless hand held multimedia device.

16. The electronic wireless hand held multimedia device of claim 15, wherein said mobile payment module enables a user of said electronic wireless hand held multimedia device to make a payment and/or management a financial account over a data network and/or at a wireless point of sale.

17. The electronic wireless hand held multimedia device of claim 15, further comprising a video camera that enables the capture, storage, processing and transmission of video and photos via said electronic wireless hand held multimedia device.

18. The electronic wireless hand held multimedia device of claim 15, further comprising a cartridge reader configured to transfer data with an electronic cartridge.

19. The electronic wireless hand held multimedia device of claim 15, further comprising a security module enabling protected data management and communications security.

20. The electronic wireless hand held multimedia device of claim 15, further comprising a wireless infrared transceiver supporting bi-directional line-of-site data communications of the electronic wireless hand held multimedia device over an Infrared wireless connection with electronic devices located within line of sight from the electronic wireless hand held multimedia device.

* * * * *